United States Patent
Hayashi et al.

(10) Patent No.: US 6,798,626 B2
(45) Date of Patent: *Sep. 28, 2004

(54) MAGNETORESISTIVE EFFECT ELEMENT HAVING A FERROMAGNETIC TUNNEL JUNCTION FILM WITH AN OXIDE OR NITRIDE OF A METALLIC MATERIAL

(75) Inventors: Kazuhiko Hayashi, Tokyo (JP); Keishi Ohashi, Tokyo (JP); Nobuyuki Ishiwata, Tokyo (JP); Masafumi Nakada, Tokyo (JP); Eizo Fukami, Tokyo (JP); Kiyokazu Nagahara, Tokyo (JP); Hiroaki Honjou, Tokyo (JP); Shinsaku Saitoh, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/356,522

(22) Filed: Feb. 3, 2003

(65) Prior Publication Data

US 2003/0151859 A1 Aug. 14, 2003

Related U.S. Application Data

(62) Division of application No. 09/583,917, filed on May 31, 2000, now Pat. No. 6,624,987.

(30) Foreign Application Priority Data

May 31, 1999 (JP) .......................................... 11-153051

(51) Int. Cl.$^7$ ................................................ G11B 5/33
(52) U.S. Cl. .................................................... 360/324.2
(58) Field of Search ...................................... 360/324.2

(56) References Cited

U.S. PATENT DOCUMENTS

| | | | |
|---|---|---|---|
| 6,052,263 A | 4/2000 | Gill | 360/324.11 |
| 6,097,579 A | 8/2000 | Gill | 360/324.2 |
| 6,108,177 A | 8/2000 | Gill | 360/324.12 |
| 6,256,178 B1 | 7/2001 | Gill | 360/324.11 |
| 6,275,363 B1 | 8/2001 | Gill | 360/324.2 |
| 6,327,107 B1 | 12/2001 | Komuro et al. | 360/324.2 |
| 6,341,053 B1 | 1/2002 | Nakada et al. | 360/324.2 |
| 6,624,987 B1 * | 9/2003 | Hayashi et al. | 360/324.2 |

FOREIGN PATENT DOCUMENTS

| | | |
|---|---|---|
| JP | 2-61572 | 3/1990 |
| JP | 4-103014 | 4/1992 |
| JP | 8-194921 | 7/1996 |
| JP | 10-162327 | 6/1998 |

* cited by examiner

Primary Examiner—David Davis
(74) Attorney, Agent, or Firm—Young & Thompson

(57) ABSTRACT

A magnetoresistive effect element which is easy to manufacture and in which a sense current is prevented from bypassing a barrier layer is provided. Also provided are a method for manufacturing the element and a magnetic recording apparatus utilizing the element. This magnetoresistive effect element utilizes an MTJ film which comprises, for forming its basic structure, a free layer, a barrier layer, a pinned layer and a pinning layer, wherein an oxide or a nitride layer is formed by oxidizing or nitriding metallic materials constituting the pinned layer and pinning layer.

3 Claims, 18 Drawing Sheets

11, 12, 8, 10

22

14   13

21

6  6  6

14  13  15

8

13

11, 12, 8, 7, 6

13

21

12     13

8

12   13   15

MAGNETORESISTIVE EFFECT ELEMENT HAVING A FERROMAGNETIC TUNNEL JUNCTION FILM WITH AN OXIDE OR NITRIDE OF A METALLIC MATERIAL

TECHNICAL FIELD

This invention relates to a magnetic device including a magnetoresistive element such as a magnetic head for recording an information signal on and/or reading/reproducing an information signal from a magnetic medium, a method for manufacturing such a head and a magnetic recording apparatus using such a head.

This application is based on Japanese Patent Application No. Hei 11-1153051, the contents of which are incorporated herein by reference.

BACKGROUND OF THE INVENTION

Various documents disclose a transducer for the magnetic data reading called a magnetoresistive sensor (hereinafter referred to as "MR sensor") or head, and it has been known that such a sensor can read data from a magnetized surface at a high linear density. The MR sensor detects a magnetic field signal through a change in resistance which is sensed by a read element as a function of the strength and direction of the magnetic flux. This type of conventional MR sensor operates based on the anisotropic magnetoresistive effect (hereinafter referred to as "AMR effect") in which one component of the resistance of the read element changes in proportion to the square of the cosine of the angle between the direction of magnetization and the direction of the sense current flowing through the element. The AMR effect is described in detail by D. A. Thompson et al. in the article "Memory, Storage and Related Applications", IEEE Trans. on Mag. MAG-11, page 1039 (1975). In magnetic heads utilizing the AMR effect, a longitudinal bias is often applied to suppress Barkhausen noise wherein an antiferromagnetic material such as FeMn, NiMn and nickel oxide is used as the longitudinal biasing material.

Recently, some documents have described a more remarkable magnetoresistive effect in which the change in resistance in a laminated magnetic sensor is caused by a spin-dependent transmission of conduction electrons between magnetic layers through a nonmagnetic layer and the accompanying spin-dependent scattering at the interface of the layers. This magnetoresistive effect is called by various names such as "giant magnetoresistive effect" and "spin-valve effect". This type of magnetoresistive sensor is made of appropriate materials and has an improved sensitivity and a larger resistance change as compared to those observed in a sensor utilizing the AMR effect. In an MR sensor of this type, the resistance in a plane between a pair of ferromagnetic layers separated by a nonmagnetic layer changes in proportion to the cosine of the angles between the directions of magnetization of the two layers.

Japanese Unexamined Patent Application, First Publication No. Hei. 2-61572 which claims a priority of June 1988 discloses a laminated magnetic structure which can provide a large MR change caused by an antiparallel alignment of magnetizations in the magnetic layers. The specification of this publication refers to ferromagnetic transition metals and alloys as materials which can be used in the laminated structure. It also discloses a structure in which a pinning layer is added to at least one of the two ferromagnetic layers separated by an intermediate layer, and the fact that FeMn is suitable for the pinning layer.

Japanese Unexamined Patent Application, First Publication No. Hei. 4-103014 filed on Aug. 22, 1990, describes a ferromagnetic tunnel junction film which takes the form of a multilayer film having an intermediate layer inserted between ferromagnetic layers, wherein a biasing magnetic field from an antiferromagnetic material is applied to at least one of the ferromagnetic layers.

Japanese Unexamined Patent Application, First Publication No. Hei 10-162327 which claims a priority of Nov. 27, 1996 describes about an example of reproducing heads with a ferromagnetic tunnel junction film which has such a structure that a layer (longitudinal biasing layer) for controlling magnetic domains in the free layer does not contact the free layer, wherein a film of a material other than the metallic materials constituting the ferromagnetic tunnel junction film is formed.

There has been proposed a shield type magnetoresistive effect element utilizing a ferromagnetic tunnel junction film which has such a structure that the longitudinal biasing layer is prevented from directly contacting the ferromagnetic tunnel junction film by means of an insulating material such as alumina (see Japanese Unexamined Patent Application, First Publication No. Hei 10-162327). This is to solve the problem that, although in the case of a shield type element with a ferromagnetic tunnel junction a sense current should flow through the tunnel junction portion perpendicularly thereto, with a structure similar to that of the conventional shield type element utilizing a spin valve a sense current bypasses the barrier layer and flows through the longitudinal biasing portion which is located near the barrier layer and has lower resistance value than that of the barrier layer, as a result of which the sense current does not contribute to the detection of the resistance change. However, since this structure is attained by means of a process of further forming a film of alumina upon end portions of the ferromagnetic tunnel junction film formed by patterning in advance, during the patterning process of the ferromagnetic tunnel junction film, metal is scattered when patterning those of the layers constituting the ferromagnetic tunnel junction film which are disposed below the barrier layer, and the scattered metal is redeposited on side walls of those layers including the barrier layers which have already been patterned. Consequently, the sense current bypasses the barrier layer and flows through the redeposited layer in the finished element, causing the MR ratio to be significantly reduced.

SUMMARY OF THE INVENTION

It is therefore an object of the present invention to provide a magnetoresistive effect element which is easy to manufacture and in which the sense current is prevented from bypassing the barrier layer.

It is another object of the invention to provide a method for manufacturing such a magnetoresistive effect element.

It is a further object of the invention to provide an apparatus which uses such a magnetoresistive effect element.

In the first aspect of the present invention, a magnetoresistive effect element comprising: a ferromagnetic tunnel junction film which comprises, for forming a basic structure thereof, an arrangement of a free layer, a barrier layer formed on the free layer and a pinned layer formed on the barrier layer or an arrangement of a pinned layer, a barrier layer formed on the last-mentioned pinned layer and a free layer formed on the last-mentioned barrier layer, wherein pattern of the ferromagnetic tunnel junction film comprises an oxide or a nitride of a metallic material constituting the ferromagnetic tunnel junction film.

In the second aspect of the invention, a magnetoresistive effect element comprising: a ferromagnetic tunnel junction film which comprises, for forming a basic structure thereof, an arrangement of a free layer, a barrier layer formed on the free layer, a pinned layer formed on the barrier layer and a pinning layer formed on the pinned layer or an arrangement of a pinning layer, a pinned layer formed on the last-mentioned pinning layer, a barrier layer formed on the last-mentioned pinned layer and a free layer formed on the last-mentioned barrier layer, wherein a pattern of the ferromagnetic tunnel junction film comprises an oxide or a nitride of a metallic material constituting the ferromagnetic tunnel junction film.

In the third aspect of the invention, a magnetoresistive effect element comprising: a ferromagnetic tunnel junction film which comprises, for forming a basic structure thereof, an arrangement of an underlayer, a free layer formed on the underlayer, a barrier layer formed on the free layer, a pinned layer formed on the barrier layer and a pinning layer formed on the pinned layer or an arrangement of an underlayer, a pinning layer formed on the last-mentioned underlayer, a pinned layer formed on the last-mentioned pinning layer, a barrier layer formed on the last-mentioned pinned layer and a free layer formed on the last-mentioned barrier layer, wherein a pattern of the ferromagnetic tunnel junction film comprises an oxide or a nitride of a metallic material constituting the underlayer.

In the fourth aspect of the invention, a magnetoresistive effect element comprising: a ferromagnetic tunnel junction film which comprises, for forming a basic structure thereof, an arrangement of a free layer, a barrier layer formed on the free layer, a pinned layer formed on the barrier layer, a pinning layer formed on the pinned layer and a protective layer formed on the pinning layer or an arrangement of a pinning layer, a pinned layer formed on the last-mentioned pinning layer, a barrier layer formed on the last-mentioned pinned layer, a free layer formed on the last-mentioned barrier layer and a protective layer formed on the last-mentioned free layer, wherein a pattern of the ferromagnetic tunnel junction film comprises an oxide or a nitride of a metallic material constituting the protective layer.

In the fifth aspect of the invention, a magnetoresistive effect element comprising: a substrate; a lower shield layer formed on the substrate; a lower electrode layer, at least a portion of which is formed on the lower shield layer or combined with the lower shield layer; a longitudinal biasing layer formed on the lower electrode layer and patterned so as to have a width which is smaller than that of the lower shield layer when viewed from an air-bearing surface of the head; a ferromagnetic tunnel junction film which comprises, for forming a basic structure thereof, an arrangement of a free layer, a barrier layer formed on the free layer, a pinned layer formed on the barrier layer and a pinning layer formed on the pinned layer or an arrangement of a pinning layer, a pinned layer formed on the last-mentioned pinning layer, a barrier layer formed on the last-mentioned pinned layer and a free layer formed on the last-mentioned barrier layer, at least a part of the free layer being disposed above the longitudinal biasing layer and adjoining the longitudinal biasing layer directly or with an underlayer interposed therebetween; an insulating layer formed at least on a part of the free layer and the longitudinal biasing layer; an upper electrode layer formed above the pinning layer and adjoining, at least at a part thereof, the pinning layer directly or with a protective layer interposed therebetween; and an upper shield layer, at least a part of which is formed on or combined with the upper electrode layer; wherein an oxide or a nitride of a metallic material constituting the ferromagnetic tunnel junction film is present at an end portion or a peripheral portion of a pattern of the ferromagnetic tunnel junction film.

In the sixth aspect of the invention, a magnetoresistive effect element comprising: a substrate; a lower shield layer formed on the substrate; a lower electrode layer, at least a portion of which is formed on or combined with the lower shield layer; a longitudinal biasing layer formed on the lower electrode layer and patterned so as to have a width which is smaller than that of the lower shield layer when viewed from an air-bearing surface of the head; a ferromagnetic tunnel junction film which comprises, for forming a basic structure thereof, an arrangement of a free layer, a barrier layer formed on the free layer, a pinned layer formed on the barrier layer and a pinning layer formed on the pinned layer or an arrangement of a pinning layer, a pinned layer formed on the last-mentioned pinning layer, a barrier layer formed on the last-mentioned pinned layer and a free layer formed on the last-mentioned barrier layer, at least a part of the free layer being disposed below the longitudinal biasing layer and adjoining the longitudinal biasing layer directly or with an underlayer interposed therebetween; an insulating layer formed on at least a part of the free layer and the longitudinal biasing layer; an upper electrode layer formed on the pinning layer and adjoining, at least at a portion thereof, the pinning layer directly or with a protective layer interposed therebetween; and an upper shield layer, at least a part of which is formed on or combined with the upper electrode layer; wherein an oxide or a nitride of a metallic material constituting the ferromagnetic tunnel junction film is present at an end portion or a peripheral portion of a pattern of the ferromagnetic tunnel junction film.

In the seventh aspect of the invention, a magnetoresistive effect element comprising: a substrate; a lower shield layer formed on the substrate; a lower electrode layer, at least a portion of which is formed on or combined with the lower shield layer; a ferromagnetic tunnel junction film which comprises, for forming a basic structure thereof, an arrangement of a free layer, a barrier layer formed on the free layer, a pinned layer formed on the barrier layer and a pinning layer formed on the pinned layer or an arrangement of a pinning layer, a pinned layer formed on the last-mentioned pinning layer, a barrier layer formed on the last-mentioned pinned layer and a free layer formed on the last-mentioned barrier layer, the film being formed on the lower electrode layer, the free layer having a width equal to or less than that of the lower electrode layer when viewed from an air-bearing surface of the element; a longitudinal biasing film comprising a film formed by laminating an insulating layer, at least a portion of which adjoins the free layer, and a longitudinal biasing layer formed on the insulating layer, or an insulating material; an upper electrode layer disposed above the free layer and adjoining, at least at a portion thereof, the free layer directly or with a protective layer interposed therebetween; and an upper shield layer, at least a part of which is formed on or combined with the upper electrode layer; wherein an oxide or a nitride of a metallic material constituting the ferromagnetic tunnel junction film is present at an end portion or a peripheral portion of a pattern of the ferromagnetic tunnel junction film.

In the eighth aspect of the invention, a magnetoresistive effect element comprising: a substrate; a lower shield layer formed on the substrate; a lower electrode layer, at least a portion of which is formed on or combined with the lower shield layer; a ferromagnetic tunnel junction film which comprises, for forming a basic structure thereof, an arrangement of a free layer, a barrier layer formed on the free layer, a pinned layer formed on the barrier layer and a pinning layer formed on the pinned layer or an arrangement of a pinning layer, a pinned layer formed on the last-mentioned pinning layer, a barrier layer formed on the last-mentioned pinned layer and a free layer formed on the last-mentioned barrier layer, the film being formed on the lower electrode layer, the free layer having a width equal to or less than that of the lower electrode layer when viewed from an air-bearing surface of the element; an insulating layer adjoining at a part thereof the free layer; a longitudinal biasing layer disposed above the free layer and adjoining, at least at a part thereof, the free layer directly or with an interface control layer interposed therebetween; an upper electrode layer disposed above the longitudinal biasing layer and adjoining, at least at a portion thereof, the longitudinal biasing layer; and an upper shield layer, at least a part of which is formed on or combined with the upper electrode layer; wherein an oxide or a nitride of a metallic material constituting the ferromagnetic tunnel junction film is present at an end portion or a peripheral portion of a pattern of the ferromagnetic tunnel junction film.

In the ninth aspect of the invention, a method for manufacturing a magnetoresistive effect element which utilizes as its magnetoresistive effect element a ferromagnetic tunnel junction film comprising the steps of: forming a basic structure of the ferromagnetic tunnel junction film, an arrangement of a free layer, a barrier layer formed on the free layer and a pinned layer formed on the barrier layer or an arrangement of a pinned layer, a barrier layer formed on the last-mentioned pinned layer and a free layer formed on the last-mentioned barrier layer; and after patterning the ferromagnetic tunnel junction film, oxidizing or nitriding an end portion of the patterned ferromagnetic tunnel junction film.

In the tenth aspect of the invention, a method for manufacturing a magnetoresistive effect element which utilizes as its magnetoresistive effect element a ferromagnetic tunnel junction film comprising the steps of: forming a basic structure of the ferromagnetic tunnel junction film, an arrangement of a free layer, a barrier layer formed on the free layer, a pinned layer formed on the barrier layer and a pinning layer formed on the pinned layer or an arrangement of a pinning layer, a pinned layer formed on the last-mentioned pinning layer, a barrier layer formed on the last-mentioned pinned layer and a free layer formed on the last-mentioned barrier layer; when the ferromagnetic tunnel junction film is patterned, stopping patterning the film in the middle of the layers constituting the magnetoresistive effect element; and oxidizing or nitriding at least a surface of that region of the magnetoresistive element at which the patterning has been stopped in the middle.

In the eleventh aspect of the invention, a magnetoresistive conversion system comprising: a magnetoresistive sensor comprising a magnetoresistive effect element; a current generating circuit for generating a current to be passed through the magnetoresistive sensor; and a data reading circuit for detecting a change in resistivity of the magnetoresistive sensor as a function of a detected magnetic field.

In the twelfth aspect of the invention, a magnetic storage system comprising: a magnetic recording medium having a plurality of tracks for data recording; a magnetoresistive conversion system; a first actuator for moving the magnetoresistive conversion system to a selected track on the magnetic recording medium; and a second actuator for driving the magnetic recording medium so as to rotate the magnetic recording medium.

In the case of the above-described magnetoresistive effect elements, after the ferromagnetic tunnel junction film (hereinafter referred to as "MTJ film") is formed, a layer composed of an oxide or nitride of the metallic materials constituting the pinned and pinning layers can be formed by oxidizing or nitriding the sidewall portions of at least the pinned and pinning layers of the MTJ film. Thus, the magnetoresistive effect head according to the invention is quite easy to manufacture. Even when a redeposited layer of metal is formed on the sidewalls of the MTJ film thus patterned, it is possible to prevent a current from bypassing the barrier layer by oxidizing or nitriding the redeposited layer in the manufacturing process, since an oxide or a nitride formed thereby is an insulator and does not contribute to electric conduction. The yield can thus be improved.

Furthermore, it will be possible to obtain a magnetoresistive effect element which has little noise in its reproduction signal waveform, a higher S/N (Signal to Noise) ratio and a lower error rate. It is also possible to construct a high-performance magnetic recording (or recording/reproducing) apparatus by the employment of this magnetoresistive effect element.

DESCRIPTION OF THE PREFERRED
EMBODIMENTS OF THE INVENTION

Figure 1:
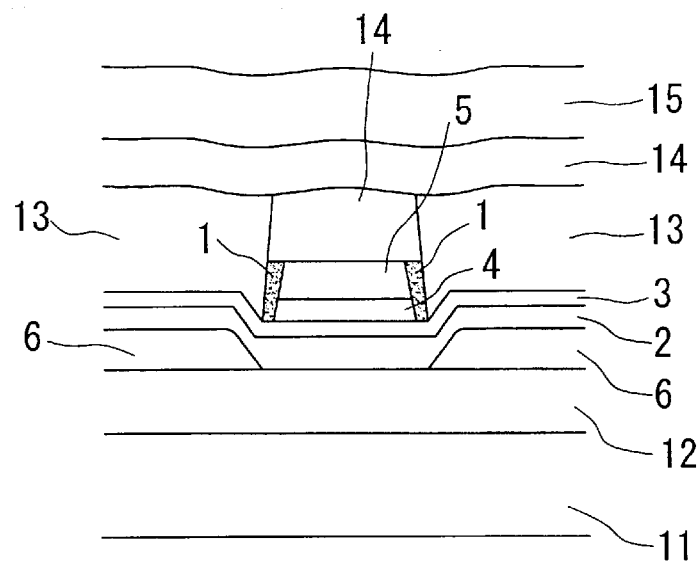
FIG. 1 is a schematic side sectional view of a magnetoresistive effect element provided in accordance with a first embodiment of the invention.

Magnetoresistive effect elements provided in accordance with the first to sixth embodiments of the invention will now be described with reference to the accompanying drawings.
First Embodiment FIG. 1 is an illustration showing a magnetoresistive effect element according to the first embodiment in cross-section parallel to its air-bearing surface (hereinafter referred to as "ABS").

In this arrangement, a lower shield layer 11 and a lower electrode layer 12 are deposited on a substrate (not shown).

Upon these layers, a free layer 2 and a barrier layer 3 are sequentially deposited. A pinned layer 4, a pinning layer 5 and an upper electrode layer 14 are deposited on the barrier layer 3 between right and left longitudinal biasing layers 6 and then patterned as shown in FIG. 1. A layer made of an oxide or nitride of the metallic materials constituting the pinned and pinning layers 4 and 5 (i.e., oxide or nitride of the metallic materials constituting a ferromagnetic tunnel junction film) is formed on the side walls of the patterned pinned and pinning layers 4 and 5. Such layer will hereinafter be called as "oxide layer" and "nitride layer" and designated by reference numeral 1. Insulating layers 13 are provided on the right and left sides of the layers 1. On these layers, an upper electrode layer 14 and an upper shield layer 15 are further deposited.

The portion constituted by the lamination of free layer 2/barrier layer 3/pinned layer 4/pinning layer 5 corresponds to an MTJ film (ferromagnetic tunnel junction film).

Figure 19:
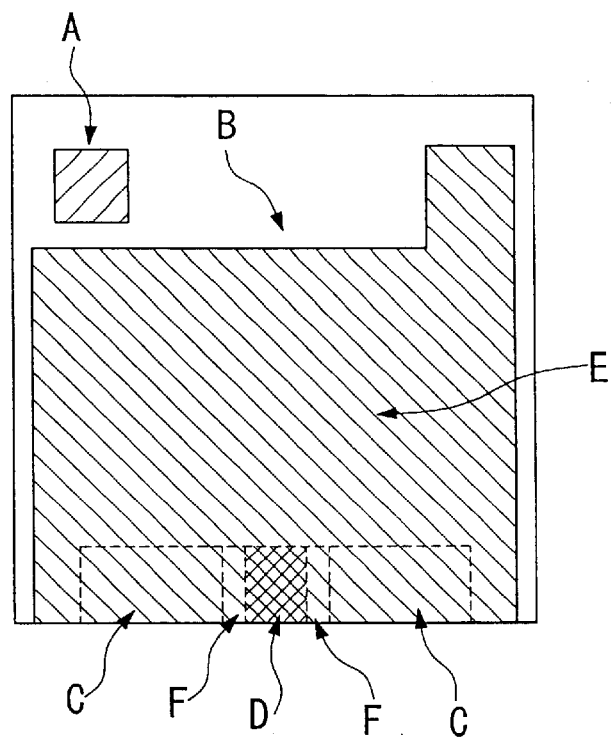
FIG. 19 is a schematic plan view of the magnetoresistive effect element provided in accordance with the first embodiment of the invention of FIG. 1.

FIG. 19 is a plan view of the above magnetoresistive effect element. In FIG. 19, shown at A is a portion where a lamination of lower shield layer 11/lower electrode layer 12/free layer 2/barrier layer 3/insulating layer 13 is provided. Similarly, B represents the portion where a lamination of lower shield layer 11/lower electrode layer 12/free layer 2/barrier layer 3/insulating layer 13 is provided, C the portion where a lamination of lower shield layer 11/lower electrode layer 12/longitudinal biasing layer 6/free layer 2/barrier layer 3/insulating layer 13/upper electrode layer 14/upper shield layer 15 is provided, D the portion where a lamination of lower shield layer 11/lower electrode layer 12/free layer 2/barrier layer 3/pinned layer 4/pinning layer 5/upper electrode layer 14/upper shield layer 15 is provided, E the portion where a lamination of lower shield layer 11/lower electrode layer 12/free layer 2/barrier layer 3/insulating layer 13/upper electrode layer 14/upper shield layer 15 is provided and F the portion where a lamination of lower shield layer 11/lower electrode layer 12/free layer 2/barrier layer 3/oxide/nitride layer 1/upper electrode layer 14/upper shield layer 15 is provided.

With this magnetoresistive effect element, when it is assumed that a current is caused to flow from the upper electrode layer 14 to the lower electrode layer 12 in FIG. 1, the current flows from the upper electrode layer 14 successively through the pinning layer 5, the pinned layer 4, the barrier layer 3 and the free layer 2 to the lower electrode layer 12 and does not pass through any other current paths.

Although a description was given above for a structure such that the lower electrode layer 12 is deposited on the lower shield layer 11 with the upper shield layer 15 being deposited on the upper electrode layer 14, it is possible to provide as a gap layer an insulating layer between the lower shield layer 11 and the lower electrode layer 12 or between the upper electrode layer 14 and the upper shield layer 15. The lower shield layer 11 and the lower electrode layer 12 or the upper electrode layer 14 and the upper shield layer 15 may be combined together. It is also possible to a provide an underlayer between the lower electrode layer 12 and the free layer 2 and/or an upper layer between the pinning layer 5 and the upper electrode layer 14.

Modifications of the above-described embodiment will now be described with reference to FIGS. 2 to 12.

Figure 2:
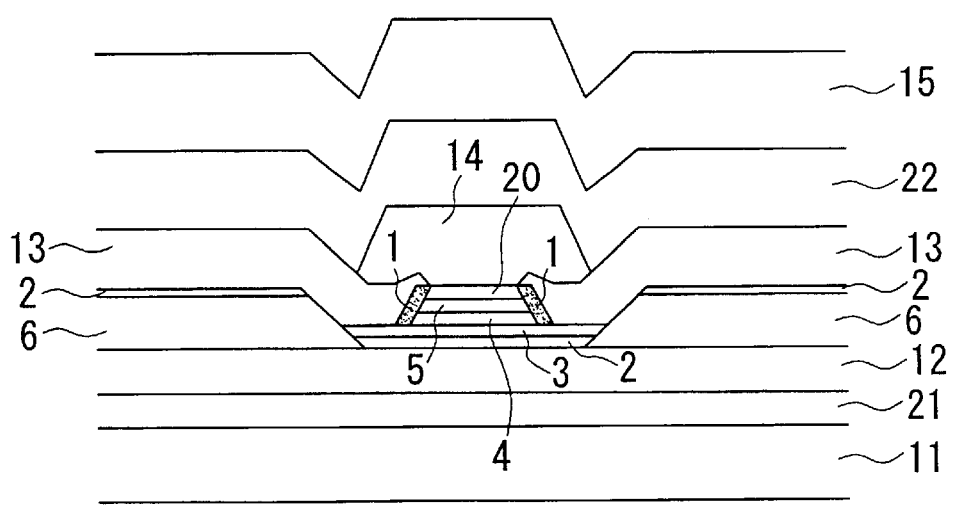
FIG. 2 is a schematic side sectional view of another magnetoresistive effect element provided in accordance with the first embodiment of the invention.

FIG. 2 is an illustration showing a modified magnetoresistive effect element in cross-section parallel to its ABS. In this arrangement, a lower shield layer 11, a lower gap layer 21 and a lower electrode layer 12 are deposited on a substrate. Upon these layers, a lamination of an underlayer (not shown)/free layer 2/barrier layer 3 is provided. A lamination of a pinned layer 4/pinning layer 5/upper layer 20/upper electrode layer 14 is provided on the lamination of the underlayer/free layer 2/barrier layer 3 between right and left longitudinal biasing layers 6 and is patterned as shown in FIG. 2. An oxide or nitride layer 1 (i.e., oxide or nitride of metallic materials constituting the pinned and pinning layers 4 and 5) is formed on the side walls of the patterned lamination of pinned layer 4/pinning layer 5. Insulating layers 13 are further provided on the right and left sides of the layers 1. An upper electrode layer 14, an upper gap layer 22 and an upper shield layer 15 are deposited on these layers.

The portion constituted by the lamination of the underlayer/free layer 2/barrier layer 3/pinned layer 4/pinning layer 5 corresponds to an MTJ film.

With this structure, when it is assumed that a current is caused to flow from the upper electrode layer 14 to the lower electrode layer 12 in FIG. 2, the current flows from the upper electrode layer 14 successively through the pinning layer 5, the pinned layer 4, the barrier layer 3 and the free layer 2 to the lower electrode layer 12 and does not pass through any other current paths.

It should be noted that the lower gap layer 21, the upper gap layer 22, the lower electrode layer 12, the upper electrode layer 14, the underlayer of the free layer 3 and/or the upper layer 20 may be dispensed with.

Figure 3:
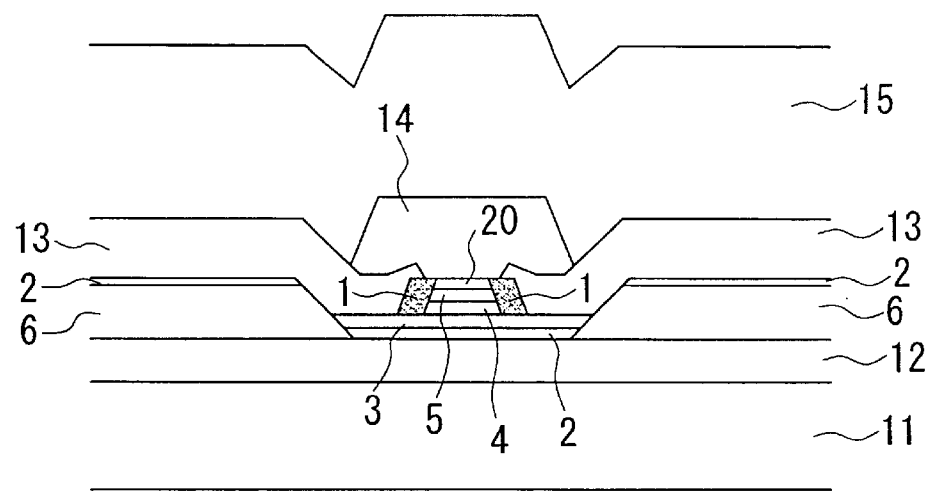
FIG. 3 is a schematic side sectional view of a further magnetoresistive effect element provided in accordance with the first embodiment of the invention.

FIG. 3 shows another structure which is similar to the structure shown in FIG. 2 but the lower gap layer 21 and the upper gap layer 22 have been omitted.

Figure 4:
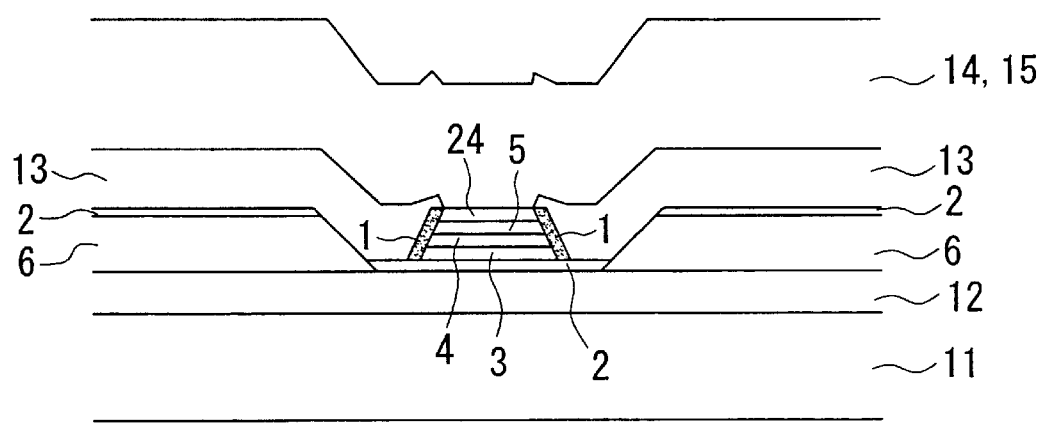
FIG. 4 is a schematic side sectional view of a further magnetoresistive effect element provided in accordance with the first embodiment of the invention.

FIG. 4 shows a further structure which is similar to the structure shown in FIG. 2 but the upper electrode layer 14 has further been omitted, that is to say, the upper electrode layer 14 has been combined with the upper shield layer 15. In this arrangement, the upper layer 20 of FIG. 2 has been omitted and instead a protective layer 24 has been formed.

Figure 5:
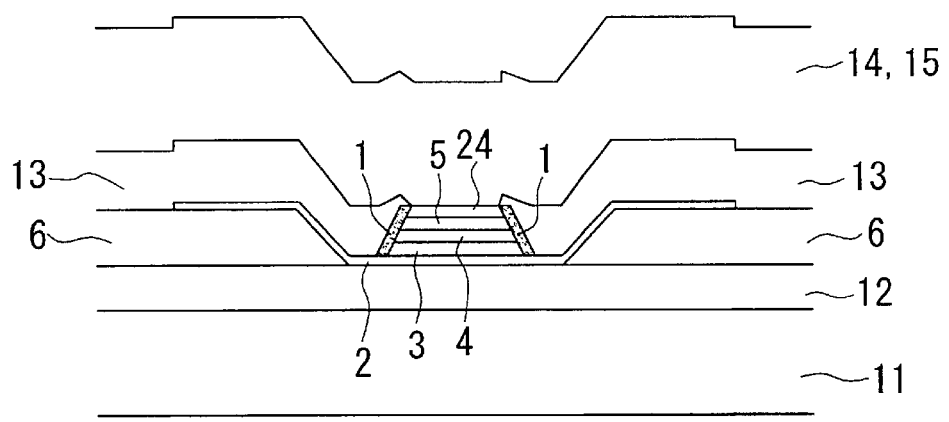
FIG. 5 is a schematic side sectional view of a further magnetoresistive effect element provided in accordance with the first embodiment of the invention.

FIG. 5 shows a further structure which is similar to the structure of FIG. 4 but the lamination of the underlayer/free layer 2 is formed also on the pattern of the longitudinal biasing layers 6 and on the end faces thereof.

Figure 6:
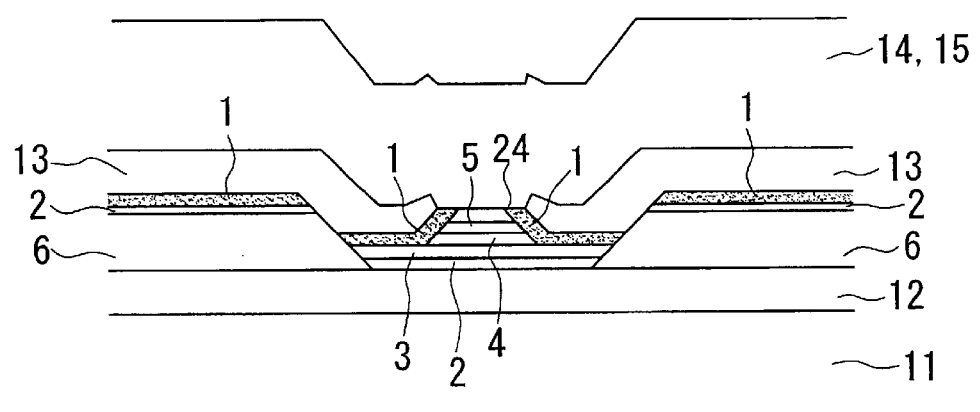
FIG. 6 is a schematic side sectional view of a further magnetoresistive effect element provided in accordance with the first embodiment of the invention.

FIG. 6 shows a further structure which is similar to the structure shown in FIG. 4 but the oxide/nitride layer 1 is formed also on the barrier layer 3. More specifically, the oxide/nitride layer 1 is formed on the side faces of the pattern of the pinned layer 4, pinning layer 5 and protective layer 24 and upper portions of the barrier layer 3. In practice, the oxide/nitride layer 1 is formed, for example, by having the pinned layer 4 remain on the barrier layer 3 and then oxidizing them. In that case, the side faces of the pinned layer 4, pinning layer 5 and protective layer 24 are also oxidized. Metallic materials redeposited on the side faces of the pinned layer 4, pinning layer 5 and protective layer 24 during the patterning process are thus oxidized. Although the oxide/nitride layer 1 is formed also on the longitudinal biasing layer 6 in this example as shown in FIG. 6, this may be dispensed with. The oxide/nitride layer 1 does not necessarily have to be formed entirely on the side faces of the pinned layer 4, pinning layer 5 and protective layer 24 but may be formed only on a part of the side faces. Furthermore, the protective layer 24 and the underlayer of the free layer 2 may be omitted.

Figure 7:
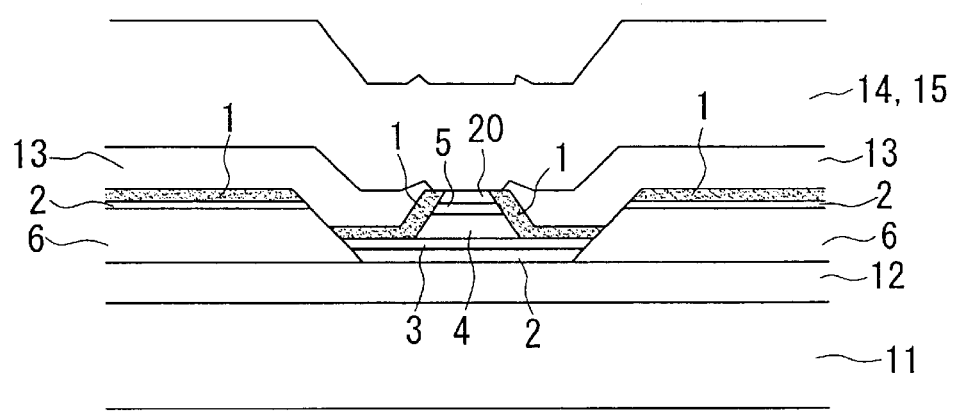
FIG. 7 is a schematic side sectional view of a further magnetoresistive effect element provided in accordance with the first embodiment of the invention.

FIG. 7 shows a modification of the structure shown in FIG. 6. The oxide/nitride layer 1 formed on the barrier layer 3 as well as the longitudinal biasing layers 6 does not necessarily have to have substantially the same film thickness as the pinned layer 4 but may have a film thickness which is significantly different from that of the pinned layer 4 as shown. Also, the oxide/nitride layer 1 on the barrier layer 3 does not necessarily have to be made of an oxide or nitride of the metallic materials constituting the pinned layer 4 but may contain an oxide or nitride of the metallic materials constituting the pinning layer 5 and/or upper layer 20 formed thereon.

Figure 8:
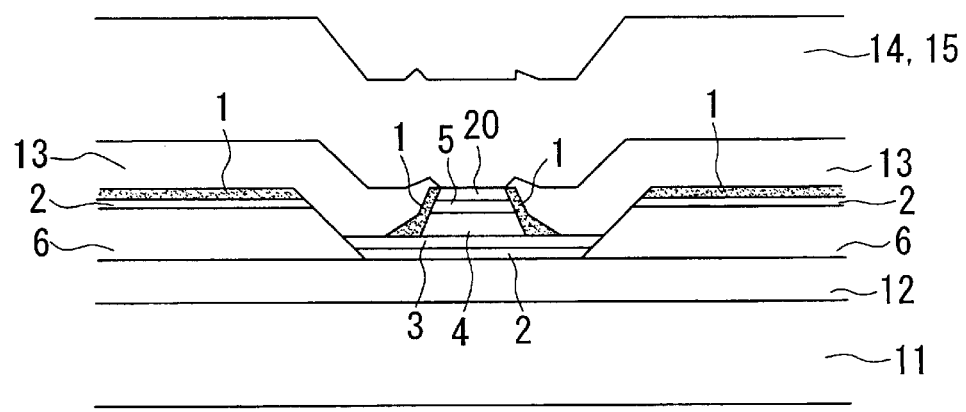
FIG. 8 is a schematic side sectional view of a further magnetoresistive effect element provided in accordance with the first embodiment of the invention.

FIG. 8 shows another modification of the structure shown in FIG. 6, in which the oxide/nitride layer 1 is formed not only on the side faces of the lamination of pinned layer 4/pinning layer 5/upper layer 20 but also on the barrier layer 3 in the vicinity of the pattern of pinned layer 4/pinning layer 5/upper layer 20. This structure corresponds to the case where the oxide/nitride layer 1 is formed by later oxidizing the portion of the pinned layer 4 which has been left on the barrier layer 3 in the vicinity of the pattern of pinned layer 4/pinning layer 5/upper layer 20 in the patterning process.

Figure 9:
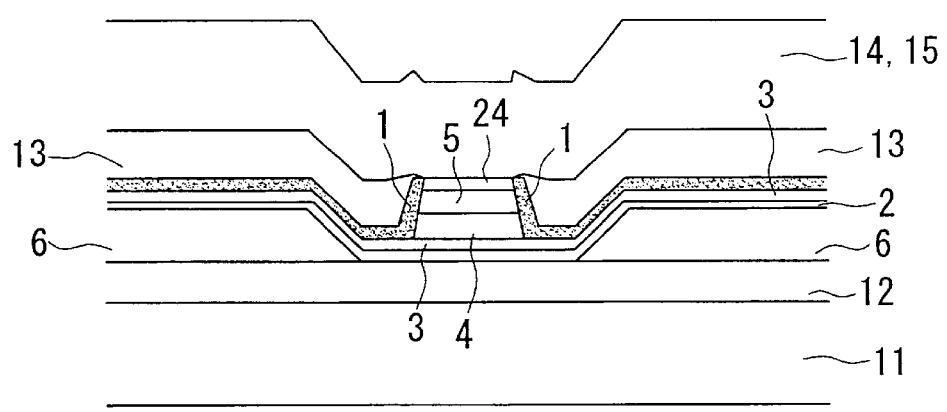
FIG. 9 is a schematic side sectional view of a further magnetoresistive effect element provided in accordance with the first embodiment of the invention.

FIG. 9 shows a modification of the structure shown in FIG. 7, wherein the oxide/nitride layer 1 is formed also on the slopes of the longitudinal biasing layers 6.

Figure 10:
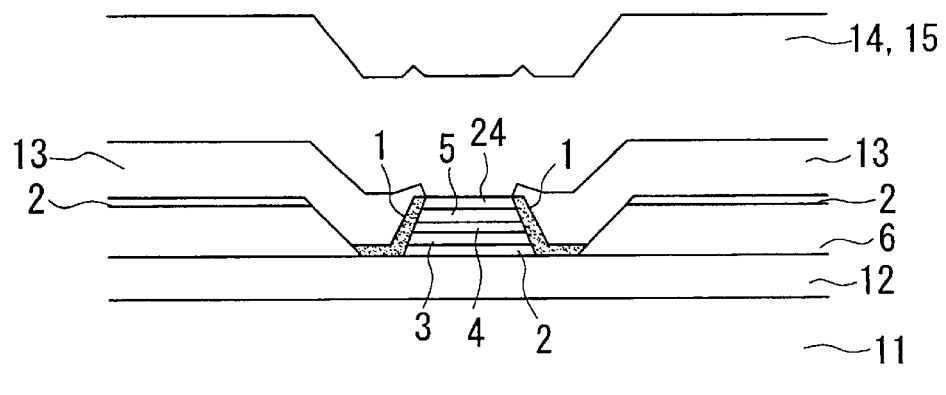
FIG. 10 is a schematic side sectional view of a further magnetoresistive effect element provided in accordance with the first embodiment of the invention.

FIG. 10 shows another structure in which the oxide/nitride layer 1 is formed on the side faces of the lamination of free layer 2/barrier layer 3/pinned layer 4/pinning layer 5/protective layer 24 as well as on the lower electrode layer 12. This structure corresponds to the case where the oxide/nitride layer 1 is formed by later oxidizing the free layer 2 which has been left in the patterning process. Although the oxide/nitride layer 1 is not formed on the pattern of the longitudinal biasing layers 6 in this example as shown in FIG. 10, the layer 1 may be formed on the layers 6. Also, the shown example has no oxide/nitride layer 1 formed on the slopes of the pattern of the longitudinal biasing layers 6, but the layer 1 may be formed on the slopes.

Figure 11:
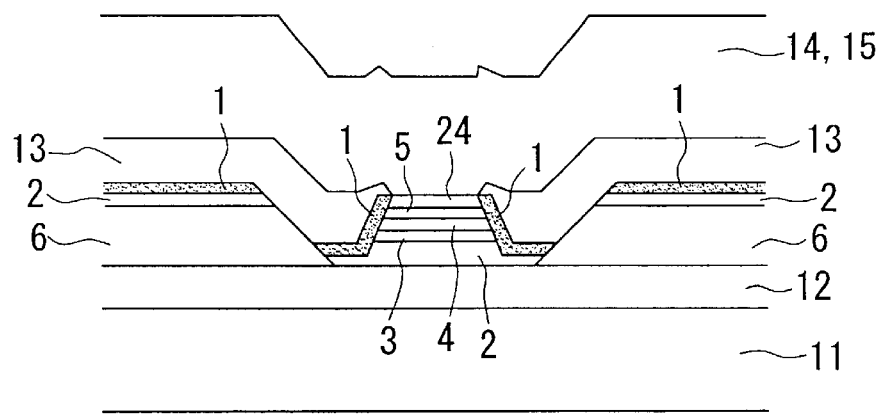
FIG. 11 is a schematic side sectional view of a further magnetoresistive effect element provided in accordance with the first embodiment of the invention.

FIG. 11 shows a further structure in which the oxide/nitride layer 1 is formed on the side faces of the lamination of free layer 2/barrier layer 3/pinned layer 4/pinning layer 5/protective layer 24 as well as on the free layer 2. This structure corresponds to the case where the oxide/nitride layer 1 is formed by later oxidizing the upper portion of the free layer 2 which has been left in the patterning process. Although the oxide/nitride layer 1 is formed on the pattern of the longitudinal biasing layers 6 in this example as shown in FIG. 11, the layer 1 may not be formed on the layers 6. Also, the shown example has no oxide/nitride layer 1 formed on the slopes of the pattern of the longitudinal biasing layers 6, but the layer 1 may be formed on the slopes.

Figure 12:
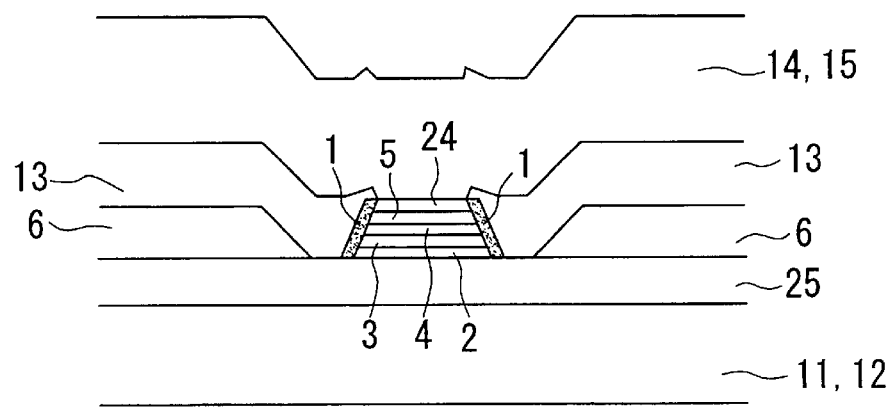
FIG. 12 is a schematic side sectional view of a further magnetoresistive effect element provided in accordance with the first embodiment of the invention.

FIG. 12 shows a further structure in which the lamination of the free layer 2/barrier layer 3/pinned layer 4/pinning layer 5/upper layer 20 is patterned and in which the oxide/nitride layer 1 is formed on the ends of the pattern. In this case, it is optional whether the underlayer of the free layer 2 is patterned or not, and the underlayer of the free layer 2 may be left on the lower electrode layer 12. The free layer 2 may be left on the patterns of the longitudinal biasing layers 6 and/or the ends of these patterns. This example is shown to have such a structure that the lower shield layer 11 is combined with the lower electrode layer 12, wherein a gap adjusting conductive layer 25 is formed on the combined layer.

In the arrangements shown in FIGS. 4 to 12, the free layer 2 has its underlayer, but such underlayer may be dispensed with.

Second Embodiment

Figure 13:
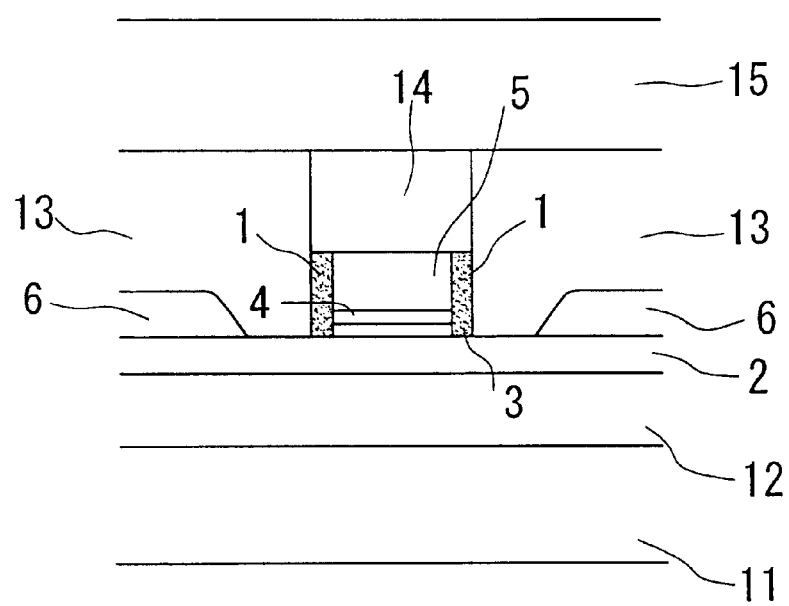
FIG. 13 is a schematic side sectional view of a magnetoresistive effect element provided in accordance with a second embodiment of the invention.

FIG. 13 shows a magnetoresistive effect element according to the second embodiment in cross-section parallel to its ABS.

In this arrangement, a lower shield layer 11, a lower electrode layer 12 and a free layer 2 are deposited in sequence on a substrate (not shown). Deposited upon these layers is a longitudinal biasing layer 6 which is patterned as shown in FIG. 13. A barrier layer 3, a pinned layer 4, a pinning layer 5 and an upper electrode layer 14 are deposited in sequence on the free layer 2 between the right and left longitudinal biasing layers 6, and the layers 3, 4, 5 and 14 are then patterned as shown in FIG. 13. Furthermore, insulating layers 13 are provided on the right and left sides of these layers. The portion constituted by the lamination of the free layer 2/barrier layer 3/pinned layer 4/pinning layer 5 corresponds to an MTJ film. An oxide/nitride layer 1 (a layer composed of an oxide/nitride of the metallic materials constituting the pinned and pinning layers 4 and 5) is formed on side walls of the patterned lamination of the pinned layer 4/pinning layer 5.

Figure 20:
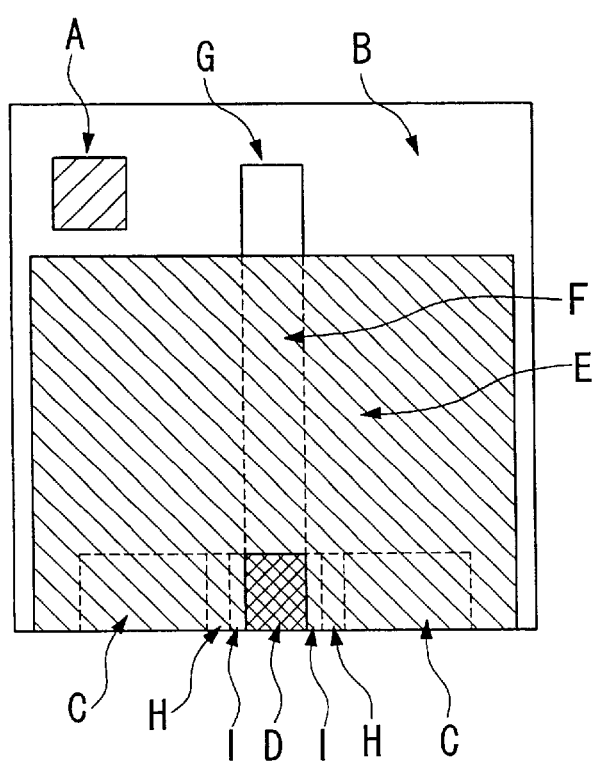
FIG. 20 is a schematic plan view of the magnetoresistive effect element provided in accordance with the second embodiment of the invention of FIG. 13.

FIG. 20 is a plan view of the above magnetoresistive effect element. In FIG. 20, shown at A is the portion where a lamination of the lower shield layer 11/lower electrode layer 12 is provided. Similarly, B represents the portion where a lamination of the lower shield layer 11/lower electrode layer 12/free layer 2/insulating layer 13 is provided; C the portion where a lamination of the lower shield layer 11/lower electrode layer 12/free layer 2/longitudinal biasing layers 6/insulating layer 13/upper shield layer 15 is provided; D the portion where a lamination of the lower shield layer 11/lower electrode layer 12/free layer 2/barrier layer 3/pinned layer 4/pinning layer 5/upper electrode layer 14/upper shield layer 15 is provided; E the portion where a lamination of the lower shield layer 11/lower electrode layer 12/free layer 2/insulating layer 13/upper shield layer 15 is provided; F the portion where a lamination of the lower shield layer 11/lower electrode layer 12/free layer 2/insulating layer 13/upper electrode layer 14/upper shield layer 15 is provided; G the portion where a lamination of the lower shield layer 11/lower electrode layer 12/free layer 2/insulating layer 13/upper electrode layer 14 is provided; H the portion where a lamination of the lower shield layer 11/lower electrode layer 12/free layer 2/insulating layer 13/upper shield layer 15 is provided; and I the portion where a lamination of the lower shield layer 11/lower electrode layer 12/free layer 2/oxide/nitride layer 1/upper electrode layer 14/upper shield layer 15 is provided.

With this magnetoresistive effect element, when it is assumed that a current is caused to flow from the upper electrode layer 14 to the lower electrode layer 12 in FIG. 13, the current flows from the upper electrode layer 14 sequentially through the pinning layer 5, the pinned layer 4, the barrier layer 3 and the free layer 2 to the lower electrode layer 12 and does not pass through any other current paths.

Although a description was given above for a structure such that the lower electrode layer 12 is deposited on the lower shield layer 11, it is possible to provide an insulating layer between the lower shield layer 11 and the lower electrode layer 12 as a gap layer. It is also possible to combine the lower shield layer 11 and the lower electrode layer 12 together. It is further possible to provide an underlayer between the lower electrode layer 12 and the free layer 2.

Third Embodiment

Figure 14:
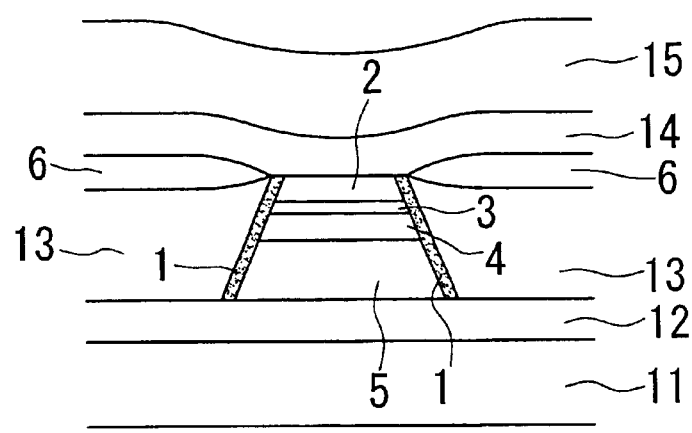
FIG. 14 is a schematic side sectional view of a magnetoresistive effect element provided in accordance with a third embodiment of the invention.

FIG. 14 illustrates a magnetoresistive effect element according to the third embodiment in cross-section parallel to its ABS.

In this arrangement, a lower shield layer 11 and a lower electrode layer 12 are deposited in sequence on a substrate (not shown). Upon these layers, a pinning layer 5, a pinned layer 4, a barrier layer 3 and a free layer 2 are sequentially deposited and patterned as shown in FIG. 14. An oxide/nitride layer 1 (i.e., a layer composed of oxide or nitride of the metallic materials which constitute the pinning layer 5, pinned layer 4, barrier layer 3 and free layer 2) is formed on side walls of the lamination of the pinning layer 5/pinned layer 4/barrier layer 3/free layer 2. Insulating layers 13 are further provided outside the layer 1. Longitudinal biasing layers 6 are provided on the right and left sides of the free layer 2. Upon these layers, an upper electrode layer 14 and an upper shield layer 15 are sequentially deposited. The portion constituted by the lamination of the pinning layer 5/pinned layer 4/barrier layer 3/free layer 2 corresponds to an MTJ film.

Figure 21:
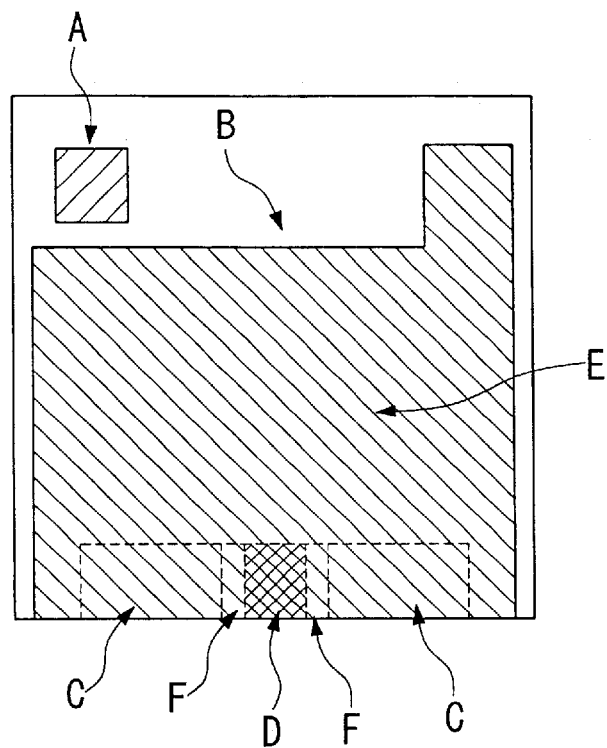
FIG. 21 is a schematic plan view of the magnetoresistive effect element provided in accordance with the third embodiment of the invention of FIG. 14.

FIG. 21 is a plan view of the above magnetoresistive effect element. In FIG. 21, shown at A is the portion where a lamination of the lower shield layer 11/lower electrode layer 12 is provided. In a similar manner, B represents the portion where a lamination of the lower shield layer 11/lower electrode layer 12/insulating layer 13 is provided; C the portion where a lamination of the lower shield layer 11/lower electrode layer 12/longitudinal biasing layer 6/upper electrode layer 14/upper shield layer 15 is provided; D the portion where a lamination of the lower shield layer 11/lower electrode layer 12/pinning layer 5/pinned layer 4/barrier layer 3/free layer 2/upper electrode layer 14/upper shield layer 15 is provided; E the portion where a lamination of the lower shield layer 11/lower electrode layer 12/insulating layer 13/upper electrode layer 14/upper shield layer 15 is provided and F the portion where a lamination of the lower shield layer 11/lower electrode layer 12/pinning layer 5/pinned layer 4/barrier layer 3/free layer 2/oxide/nitride layer 1/insulating layer 13/longitudinal biasing layer 6/upper electrode layer 14/upper shield layer 15 is provided.

With this magnetoresistive effect element, when it is assumed that a current is caused to flow from the upper electrode layer 14 to the lower electrode layer 12 in FIG. 14, the current flows from the upper electrode layer 14 successively through the free layer 2, the barrier layer 3, the pinned layer 4 and the pinning layer 5 to the lower electrode layer 12 and does not pass through any other current paths.

Although a description was given above for a structure such that the lower electrode layer 12 is deposited on the lower shield layer 11 with the upper shield layer 15 being deposited on the upper electrode layer 14, it is possible to provide as a gap layer an insulating layer between the lower shield layer 11 and the lower electrode layer 12 or between the upper electrode layer 14 and the upper shield layer 15. It is also possible to combine the lower shield layer 11 with the lower electrode layer 12 or the upper electrode layer 14 with the upper shield layer 15. It is further possible to provide an underlayer between the lower electrode layer 12 and the pinning layer 5 and/or an upper layer between the free layer 2 and the upper electrode layer 14. Although the lamination of pinning layer 5/pinned layer 4/barrier layer 3/free layer 2 of the MTJ film is patterned in the shown example, it is sufficient that at least the free layer 2 of the MTJ film is patterned, and it is optional which one of those layers of the MTJ film below the free layer 2 the MTJ film should be patterned.

Figure 15:
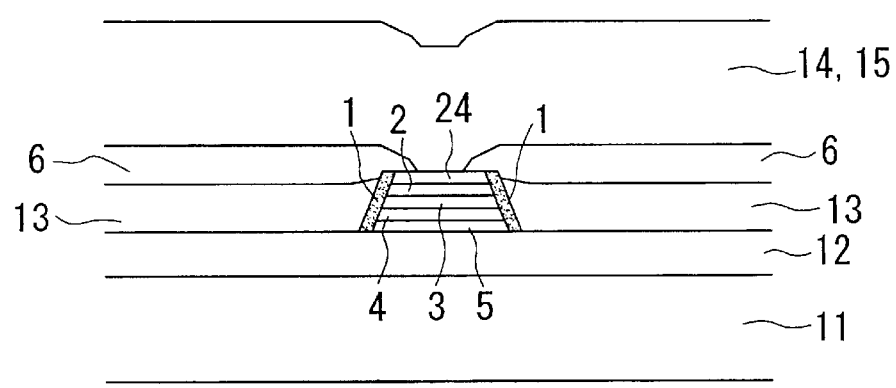
FIG. 15 is a schematic side sectional view of another magnetoresistive effect element provided in accordance with the third embodiment of the invention.

FIG. 15 shows a modification of the structure shown in FIG. 14. The structure of this modification is different from that shown in FIG. 14 in that the longitudinal biasing layers 6 extend over the free layer 2 with the protective layer 24 interposed therebetween. In this case, the protective layer 24 may be omitted.

Fourth Embodiment

Figure 16:
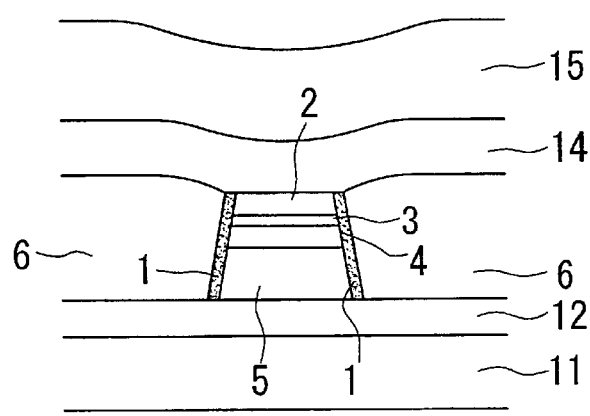
FIG. 16 is a schematic side sectional view of a magnetoresistive effect element provided in accordance with a fourth embodiment of the invention.

FIG. 16 illustrates a magnetoresistive effect element according to the fourth embodiment in cross-section parallel to its ABS.

In this arrangement, a lower shield layer 11 and a lower electrode layer 12 are deposited in sequence on a substrate (not shown). Upon these layers, a pinning layer 5, a pinned layer 4, a barrier layer 3 and a free layer 2 are sequentially deposited and patterned as shown in FIG. 16. An oxide/nitride layer 1 (i.e., a layer composed of oxide or nitride of the metallic materials which constitute the pinning layer 5, pinned layer 4, barrier layer 3 and free layer 2) is formed on the side walls of the lamination of the pinning layer 5/pinned layer 4/barrier layer 3/free layer 2. Longitudinal biasing layers 6 composed of an insulating material are further provided outside the layers 1. Upon these layers, an upper electrode layer 14 and an upper shield layer 15 are sequentially deposited. The portion constituted by the lamination of the pinning layer 5/pinned layer 4/barrier layer 3/free layer 2 corresponds to an MTJ film.

With this arrangement, when it is assumed that a current is caused to flow from the upper electrode layer 14 to the lower electrode layer 12 in FIG. 16, the current flows from the upper electrode layer 14 successively through the free layer 2, the barrier layer 3, the pinned layer 4 and the pinning layer 5 to the lower electrode layer 12 and does not pass through any other current paths.

Figure 22:
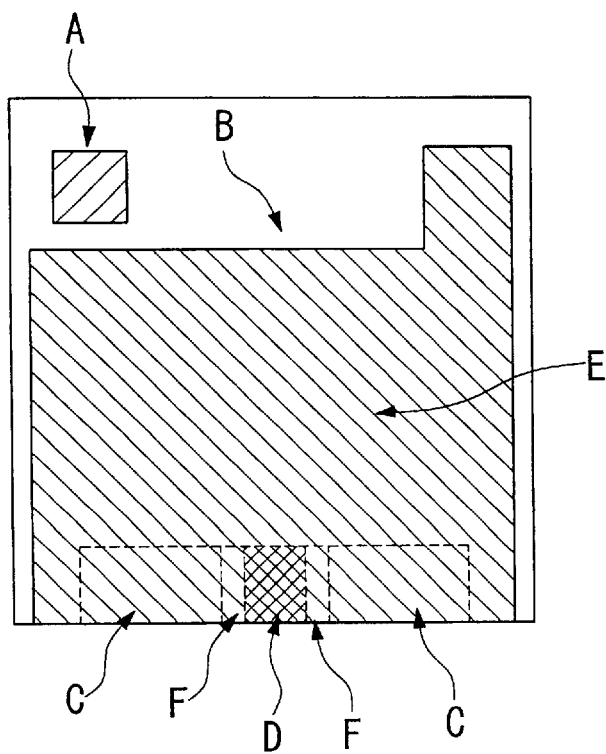
FIG. 22 is a schematic plan view of the magnetoresistive effect element provided in accordance with the fourth embodiment of the invention of FIG. 16.

FIG. 22 is a plan view of the above magnetoresistive effect element. In FIG. 22, shown at A is the portion where a lamination of the lower shield layer 11/lower electrode layer 12 is provided. In a similar manner, B represents the portion where a lamination of the lower shield layer 11/lower electrode layer 12/insulating layer 13 is provided; C the portion where a lamination of the lower shield layer 11/lower electrode layer 12/longitudinal biasing layer 6/upper electrode layer 14/upper shield layer 15 is provided; D the portion where a lamination of the lower shield layer 11/lower electrode layer 12/pinning layer 5/pinned layer 4/barrier layer 3/free layer 2/upper electrode layer 14/upper shield layer 15 is provided; E the portion where a lamination of the lower shield layer 11/lower electrode layer 12/insulating layer 13/upper electrode layer 14/upper shield layer 15 is provided; and F the portion where a lamination of the lower shield layer 11/lower electrode layer 12/pinning layer 5/pinned layer 4/barrier layer 3/free layer 2/oxide/nitride layer 1/longitudinal biasing layer 6/upper electrode layer 14/upper shield layer 15 is provided.

Although a description was given above for a structure such that the lower electrode layer 12 is deposited on the lower shield layer 11 with the upper shield layer 15 being deposited on the upper electrode layer 14, it is possible to provide as a gap layer an insulating layer between the lower shield layer 11 and the lower electrode layer 12 or between the upper electrode layer 14 and the upper shield layer 15. It is also possible to combine the lower shield layer 11 with the lower electrode layer 12 or the upper electrode layer 14 with the upper shield layer 15. It is further possible to provide an underlayer between the lower electrode layer 12 and the pinning layer 5 and/or an upper layer between the free layer 2 and the upper electrode layer 14. Although the lamination of pinning layer 5/pinned layer 4/barrier layer 3/free layer 2 of the MTJ film is patterned in the shown example, it is sufficient that at least the free layer 2 of the MTJ film is patterned, and it is optional which one of those layers of the MTJ film below the free layer 2 the MTJ film should be patterned.

Fifth Embodiment

Figure 17:
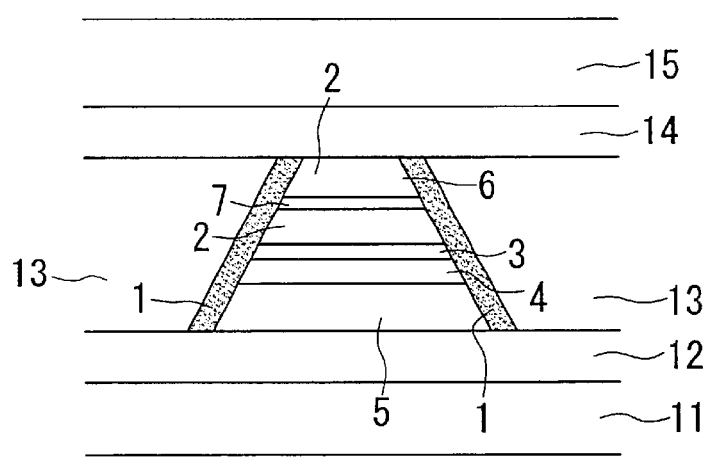
FIG. 17 is a schematic side sectional view of a magnetoresistive effect element provided in accordance with a fifth embodiment of the invention.

FIG. 17 illustrates a magnetoresistive effect element according to the fifth embodiment in cross-section parallel to its ABS.

In this arrangement, a lower shield layer 11 and a lower electrode layer 12 are deposited in sequence on a substrate (not shown). Upon these layers, a pinning layer 5, a pinned layer 4, a barrier layer 3, a free layer 2, an interface control layer 7 and a longitudinal biasing layer 6 are sequentially deposited and patterned as shown in FIG. 17. A longitudinal bias is applied to the free layer 2 after its magnitude has been controlled by the interface control layer 7. An oxide/nitride layer 1 (i.e., a layer composed of oxide or nitride of the metallic materials which constitute the pinning layer 5, pinned layer 4, barrier layer 3, free layer 2, interface control layer 7 and longitudinal biasing layer 6) is formed on side walls of the lamination of the pinning layer 5/pinned layer 4/barrier layer 3/free layer 2/interface control layer 7/longitudinal biasing layer 6. Insulating layers 13 are further provided outside the layers 1. Upon these layers, an upper electrode layer 14 and an upper shield layer 15 are sequentially deposited. The portion constituted by the lamination of the pinning layer 5/pinned layer 4/barrier layer 3/free layer 2 corresponds to an MTJ film.

Figure 23:
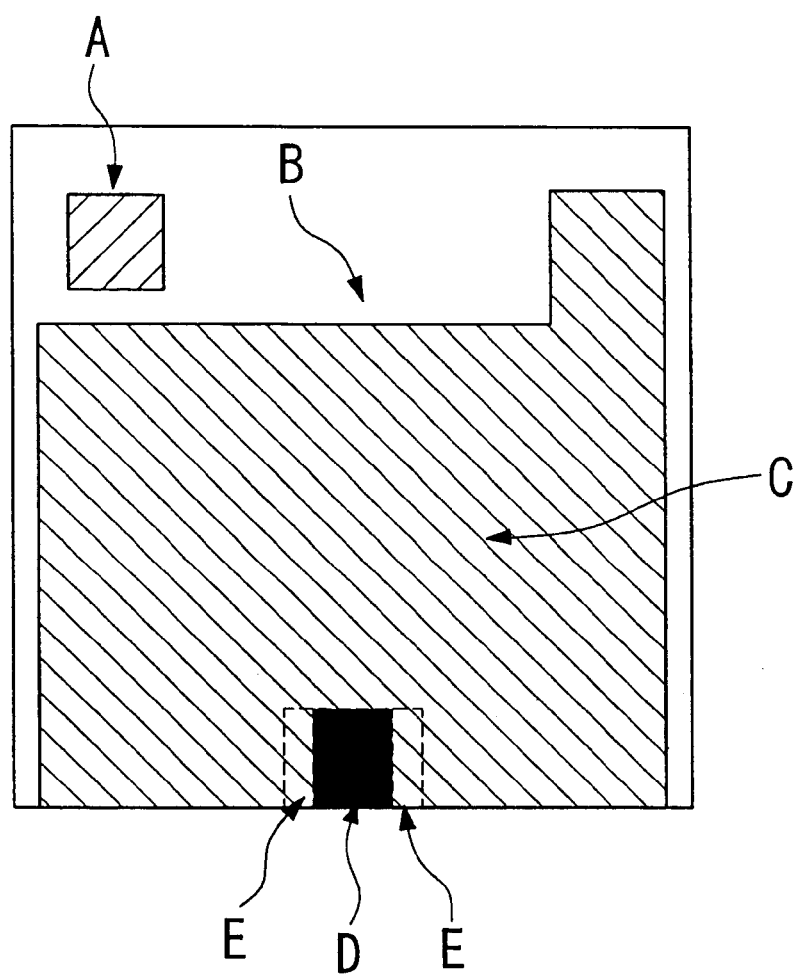
FIG. 23 is a schematic plan view of the magnetoresistive effect element provided in accordance with the fifth embodiment of the invention of FIG. 17.

FIG. 23 is a plan view of the above magnetoresistive effect element. In FIG. 23, shown at A is the portion where a lamination of the lower shield layer 11/lower electrode layer 12 is provided. In a similar manner, B represents the portion where a lamination of the lower shield layer 11/lower electrode layer 12/insulating layer 13 is provided; C the portion where a lamination of the lower shield layer 11/lower electrode layer 12/insulating layer 13/upper electrode layer 14/upper shield layer 15 is provided; D the portion where a lamination of the lower shield layer 11/lower electrode layer 12/pinning layer 5/pinned layer 4/barrier layer 3/free layer 2/interface control layer 7/longitudinal biasing layer 6/upper electrode layer 14/upper shield layer 15 is provided; and E the portion where a lamination of the lower shield layer 11/lower electrode layer 12/pinning layer 5/pinned layer 4/barrier layer 3/free layer 2/interface control layer 7/longitudinal biasing layer 6/oxide/nitride layer 1/upper electrode layer 14/upper shield layer 15 is provided.

With this arrangement, when it is assumed that a current is caused to flow from the upper electrode layer 14 to the lower electrode layer 12 in FIG. 17, the current flows from the upper electrode layer 14 successively through the longitudinal biasing layer 6, the interface control layer 7, the free layer 2, the barrier layer 3, the pinned layer 4 and the pinning layer 5 to the lower electrode layer 12 and does not pass through any other current paths.

Although a description was given above for a structure such that the lower electrode layer 12 is deposited on the lower shield layer 11 with the upper shield layer 15 being deposited on the upper electrode layer 14, it is possible to provide as a gap layer an insulating layer between the lower shield layer 11 and the lower electrode layer 12 or between the upper electrode layer 14 and the upper shield layer 15. It is also possible to combine the lower shield layer 11 with the lower electrode layer 12 or the upper electrode layer 14 with the upper shield layer 15. It is further possible to provide an underlayer between the lower electrode layer 12 and the pinning layer 5 and/or an upper layer between the longitudinal biasing layer 6 and the upper electrode layer 14. The interface control layer 7 can be omitted by selecting a suitable material for the longitudinal biasing layer 6. Although the lamination of the pinning layer 5/pinned layer 4/barrier layer 3/free layer 2 of the MTJ film 8 is patterned in the shown example, it is sufficient that at least the free layer 2 of the MTJ film is patterned, and it is optional which one of those layers of the MTJ film below the free layer 2 the film should be patterned.

Sixth Embodiment

Figure 18:
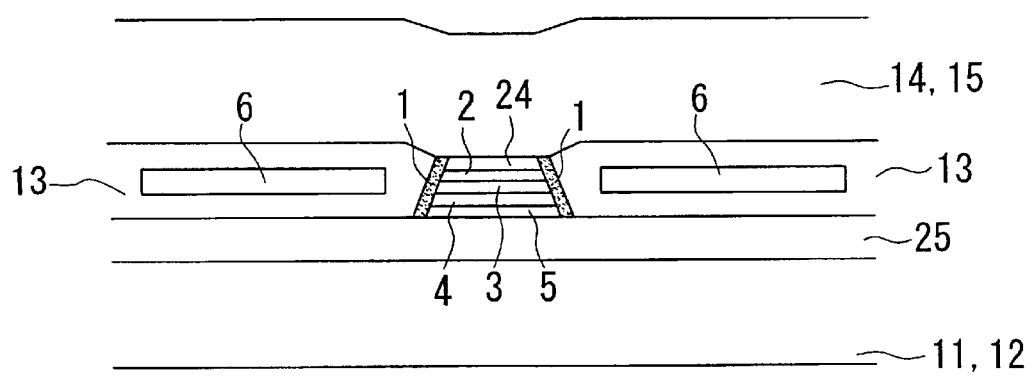
FIG. 18 is a schematic side sectional view of a magnetoresistive effect element provided in accordance with a sixth embodiment of the invention.

FIG. 18 illustrates a magnetoresistive effect element according to the sixth embodiment in cross section parallel to its ABS.

In this example, a lower shield layer 11 which also serves as a lower electrode layer 12 is deposited on a substrate (not shown). A gap adjustment conductive layer 25 is deposited on the layer 11, and a lamination of an underlayer (not shown)/pinning layer 5/pinned layer 4/barrier layer 3/free layer 2/protective layer 24 is further provided on the layer 25 and patterned. The lamination of the underlayer/pinning layer 5/pinned layer 4/barrier layer 3/free layer 2/protective layer 24 constitutes an MTJ film. An oxide/nitride layer 1 is formed on side walls of the pattern of the MTJ film. An insulating layer 13 is provided on the right and left sides of the layers 1. Longitudinal biasing layers 6 are formed on the right and left sides of the MTJ film with the insulating layer 13 interposed therebetween. The insulating layer 13 lies between the pattern of the longitudinal biasing layers 6 and the combination of the lower shield layer 11 with the lower electrode layer 12 and between the longitudinal biasing layers 6 and the combination of an upper electrode layer 14 with an upper shield layer 15. Upon these layers, the upper electrode layer 14 which is adapted to serve also as the upper shield layer 15 is further deposited.

In this example, the lower shield layer 11 and the lower electrode layer 12 and/or the upper electrode layer 14 and the upper shield layer 15 may be combined, or may also be provided separately. An upper gap layer may be provided between the upper electrode layer 14 and the upper shield layer 15, and a lower gap layer may be provided between the lower shield layer 11 and the lower electrode layer 12. The underlayer of the pinning layer 5 and the protective layer 24 on the free layer 2 may be omitted. Although the lamination of the underlayer/pinning layer 5/pinned layer 4/barrier layer 3/free layer 2/protective layer 24 is patterned in this example, it is optional up to which one of these layers the lamination is patterned.

The description was given above for the case that each longitudinal biasing layer has a rectangular shape when viewed from the top as shown in FIGS. 19 to 23, but these layers may take various other shapes.

A description will now be given in detail on each of the structures and representative examples of the manufacturing processes therefor. Some examples of applications to recording/reproducing heads will also be described.

Hereinafter, examples of materials useful for each layer will be given.

AlTiC, SiC, alumina, AlTiC/alumina and Sic/alumina are given as examples of the materials for the substrate 10.

A simple substance, a multilayer film or a mixture comprising NiFe, CoZr, CoFeD, CoZrMo, CoZrNb, CoZr, CoZrTa, CoHf, CoTa, CoTaHf, CoNbHf, CoZrNb, CoHfPd, CoTaZrNb or CoZrMoNi alloy, FeAlSi, iron-nitride group material, MnZn ferrite, NiZn ferrite or MgZn ferrite may be used for the lower shield layer 11.

A simple substance, a multilayer film or a mixture comprising Au, Ag, Cu, Mo, W, Y, Ti, Zr, Hf, V, Nb, Pt or Ta may be used for the lower electrode layer 12.

A simple substance, a multilayer film or a mixture comprising Al oxide, silicon oxide, aluminum nitride, silicon nitride, diamond-like carbon, Au, Ag, Cu, Mo, W, Y, Ti, Zr, Hf, V, Pt, Nb or Ta may be used for the interface control layer 7.

A simple substance, a multilayer film or a mixture comprising Au, Ag, Cu, Mo, W, Y, Pt, Ti, Zr, Hf, V, Nb or Ta may be used for the upper electrode layer 14.

A simple substance, a multilayer film or a mixture comprising NiFe, CoZr, CoFeB, CoZrMo, CoZrNb, CoZr, CoZrTa, CoHf, CoTa, CoTaHf, CoNbHf, CoZrNb, CoHfPd, CoTaZrNb or CoZrMoNi alloy, FeAlSi, iron-nitride group material, MnZn ferrite, NiZn ferrite or MgZn ferrite may be used for the upper shield layer 15.

A simple substance, a multilayer film or a mixture comprising aluminum oxide, silicon oxide, aluminum nitride, silicon nitride or diamond-like carbon may be used for the insulating layer 13.

A simple substance, a multilayer film or a mixture comprising Al oxide, silicon oxide, aluminum nitride, silicon nitride or diamond-like carbon may be used for the lower gap layer 21 and/or the upper gap layer 22.

A simple substance, a multilayer film or a mixture comprising Au, Ag, Cu, Mo, W, Y, Ti, Pt, Zr, Hf, V, Nb or Ta may be used for the upper layer 20.

A simple substance, a multilayer film or a mixture comprising CoCrPt, CoCr, CoPt, CoCrTa, FeMn, NiMn, Ni oxide, NiCo oxide, Fe oxide, NiFe oxide, IrMn, PtMn, PtPdMn, ReMn, Co ferrite or Ba ferrite may be used for the longitudinal biasing layer 6.

The following structures can be used for the MTJ film (magnetoresistive effect film):

A first structure may comprise a lamination of a substrate/underlayer/free layer/first MR enhancement layer/barrier layer/second MR enhancement layer/pinned layer/pinning layer/protective layer;

A second structure may comprise a lamination of a substrate/underlayer/pinning layer/pinned layer/first MR enhancement layer/barrier layer/second MR enhancement layer/free layer/protective layer;

A third structure may comprise a lamination of a substrate/underlayer/first pinning layer/first pinned layer/first MR enhancement layer/barrier layer/second MR enhancement layer/free layer/third MR enhancement layer/barrier layer/fourth MR enhancement layer/second pinned layer/second pinning layer/protective layer;

A fourth structure may comprise a lamination of a substrate/underlayer/pinning layer/first MR enhancement layer/barrier layer/second MR enhancement layer/free layer/protective layer; and A fifth structure may comprise a lamination of a substrate/underlayer/free layer/first MR enhancement layer/barrier layer/second MR enhancement layer/pinned layer/protective layer.

For the underlayer, a single layer film, a film of mixture or a multilayer film comprising a metal, an oxide and/or a nitride is used. More specifically, use is made of a single layer film, a film of mixture or a multilayer film comprising Ta, Hf, Zr, W, Cr, Ti, Mo, Pt, Ni, Ir, Cu, Ag, Co, Zn, Ru, Rh, Re, Au, Os, Pd, Nb, V or an oxide or nitride of any one of these materials. Furthermore, Ta, Hf, Zr, W, Cr, Ti, Mo, Pt, Ni, Ir, Cu, Ag, Co, Zn, Ru, Rh, Re, Au, Os, Pd, Nb and/or V can be used as an additive element. There may be cases where the underlayer is omitted as described before.

For the free layer 2, NiFe, CoFe, NiFeCo, FeCo, CoFeB, CoZrMo, CoZrNb, CoZr, CoZrTa, CoHf, CoTa, CoTaHf, CoNbHf, CoZrNb, CoHfPd, CoTaZrNb or CoZrMoNi alloy or an amorphous magnetic material may be used.

For the barrier layer 3, an oxide, a nitride, a mixture of oxide and nitride, a two-layer film of metal/oxide, a two-layer film of metal/nitride or a two-layer film of metal/a mixture of oxide and nitride is used. Potential candidates may be a simple substance, a multilayer film or a mixture of oxide or nitride of Ti, V, Cr, Co, Cu, Zn, Y, Zr, Nb, Mo, Tc, Ru, Rh, Pd, Ag, Hf, Ta, W, Re, Os, Ir, Pt, Au, Si, Al, Ti, Ta, Pt, Ni, Co, Re or V, or a film formed by laminating any one of these and a simple substance, a multilayer film or a mixture of oxide or nitride of Ti, V, Cr, Co, Cu, Zn, Y, Zr, Nb, Mo, Tc, Ru, Rh, Pd, Ag, Hf, Ta, W, Re, Os, Ir, Pt, Au, Si, Al, Ti, Ta, Pt, Ni, Co, Re or V.

For the first and/or the second MR enhancement layer, Co, NiFeCo or FeCo; or CoFeB, CoZrMo, CoZrNb, CoZr, CoZrTa, CoHf, CoTa, CoTaHf, CoNbHf, CoZrNb, CoHfPd, CoTaZrNb or CoZnMoNi alloy or an amorphous magnetic material is used. When the MR enhancement layer is not used, the MR ratio will be slightly lower than when such layer is used but the number of processes required for the manufacture will be decreased.

For the pinned layer 4, NiFe, CoFe, NiFeCo, FeCo, CoFeB, CoZrMo, CoZrNb, CoZr, CoZrTa, CoHf, CoTa, CoTaHf, CoNbHf, CoZrNb, CoHfPd, CoTaZrNb or CoZrMoNi alloy or an amorphous magnetic material may be used. It is also possible to use a film formed by laminating any of these materials and a simple substance, an alloy or a laminated film composed of a group containing as a base Ti, V, Cr, Co, Cu, Zn, Y, Zr, Nb, Mo, Tc, Ru, Rh, Pd, Ag, Hf, Ta, W, Re, Os, Ir, Pt, Au, Si, Al, Ti, Ta, Pt, Ni, Co, Re or V. Potential candidates may be a lamination of Co/Ru/Co, CoFe/Ru/CoFe, CoFeNi/Ru/CoFeNi, Co/Cr/Co, CoFe/Cr/CoFe or CoFeNi/Cr/CoFeNi.

For the pinning layer 5, for example, FeMn, NiMn, IrMn, RhMn, PtPdMn, ReMn, PtMn, PtCrMn, CrMn, CrAl, TbCo, Ni oxide, Fe oxide, a mixture of Ni oxide and Co oxide, a mixture of Ni oxide and Fe oxide, a two-layer film of Ni oxide/Co oxide, a two-layer film of Ni oxide/Fe oxide, CoCr, CoCrPt, CoCrTa or PtCo can be used. A material comprising PtMn, or PtMn to which Ti, V, Cr, Co, Cu, Zn, Y, Zr, Nb, Mo, Tc, Ru, Rh, Pd, Ag, Hf, Ta, W, Re, Os, Ir, Pt, Au, Si, Al, Ti or Ta is added may be a potential candidate.

For the protective layer 24, an oxide, a nitride, a mixture of oxide and nitride, a two-layer film of metal and oxide, a two-layer film of metal/nitride or a two-layer film of metal/a mixture of oxide and nitride is used. A simple substance, a multilayer film or a mixture of oxide and/or nitride of Ti, V, Cr, Co, Cu, Zn, Y, Zr, Nb, Mo, Tc, Ru, Rh, Pd, Ag, Hf, Ta, W, Re, Os, Ir, Pt, Au, Si, Al, Ti, Ta, Pt, Ni, Co, Re or V, or a film formed by laminating any of these materials and a simple substance, a multilayer film and a mixture of oxide or nitride of Ti, V, Cr, Co, Cu, Zn, Y, Zr, Nb, Mo, Tc, Ru, Rh, Pd, Ag, Hf, Ta, W, Re, Os, Ir, Pt, Au, Si, Al, Ti, Ta, Pt, Ni, Co, Re or V may be a potential candidate. There may be cases where the upper layer 20 is not used.

Examples of processes for manufacturing the magnetoresistive effect elements according to the first to sixth embodiments will now be described with reference to FIGS. 24 to 27.

FIGS. 24A to 24I show, by way of example, a process for manufacturing the magnetoresistive effect element according to the first embodiment, wherein the element is manufactured in sequential steps (1) to (9).

Figure 24A:
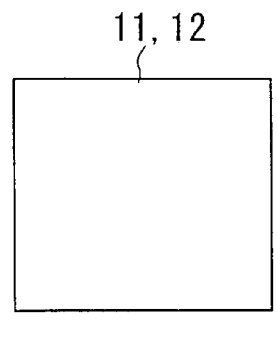
FIGS. 24A to 24I are illustrations showing in plan view the magnetoresistive effect element according to the first embodiment in various manufacturing steps.
Figure 24D:
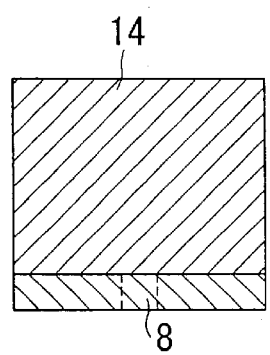
Figure 24G:
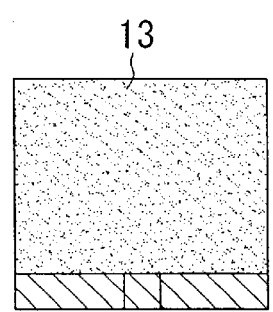

First, the lower shield layer 11 and the lower electrode layer 12 are formed in sequence on the substrate 10 (step (1) in FIG. 24A).

Figure 24B:
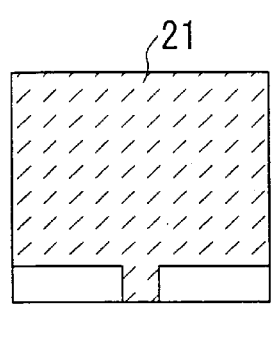
Figure 24E:
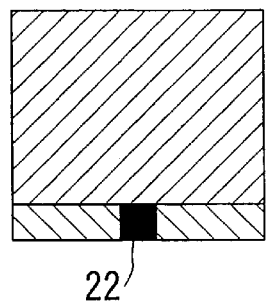
Figure 24H:
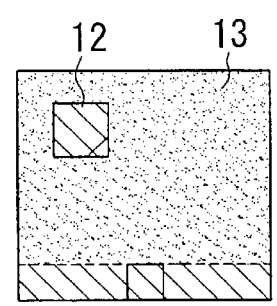
Figure 24C:
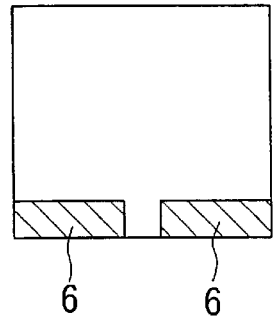
Figure 24F:
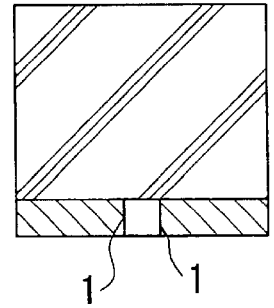
Figure 24I:
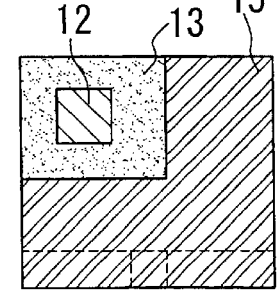

A stencil PR 21 is formed on the layer 12 (step (2) in FIG. 24B), and the longitudinal biasing layer 6 is formed and lifted off (step (3) in FIG. 24C). The MTJ film (designated by reference numeral 8) and the upper electrode layer 14 are further formed (step (4) in FIG. 24D), on which a PR 22 is formed and then subjected to milling (step (5) in FIG. 24E). Subsequently, the side walls of the patterned MTJ film 8 are oxidized or nitrided (step (6) in FIG. 24F). For the oxidation, use can be made of a method in which spontaneous oxidization is caused to occur in the air, in an atmosphere of oxygen diluted by inert elements or in an oxygen atmosphere at a reduced pressure, or of a method in which a plasma is generated in an atmosphere of oxygen diluted by inert elements at an adjusted pressure to thereby place the element in question in contact with the plasma (plasma oxidizing method). For the nitridation, a method in which a plasma is generated in an atmosphere of nitrogen diluted by an inert gas at an adjusted pressure to thereby place the element in question in contact with the plasma can suitably be used. It is also possible to oxidize or nitride the side walls of the MTJ film 8, during the time when the milling is being carried out, by introducing a suitable amount of oxygen or nitrogen in the milling gas. After the oxidization or nitridation step has been completed, the insulating layer 13 is formed and then lifted off (step (7) in FIG. 24G). A recess is formed in the insulating layer 13 down to such a level that the lower electrode is exposed (step (8) in FIG. 24H) and the upper shield layer 15 is then formed (step (9) in FIG. 24I).

FIGS. 25A to 25H show, by way of example, a process for manufacturing the magnetoresistive effect element according to the second embodiment, wherein the element is manufactured in sequential steps (1) to (8).

Figure 25A:
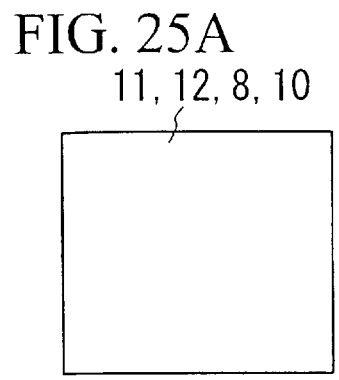
FIGS. 25A to 25H are illustrations showing in plan view the magnetoresistive effect element according to the second embodiment in various manufacturing steps.
Figure 25D:
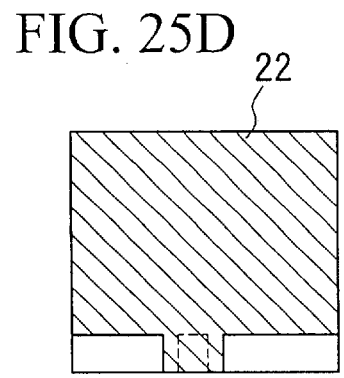
Figure 25G:
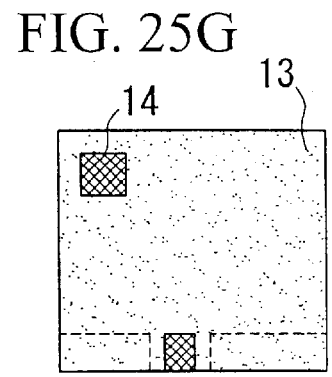
Figure 25B:
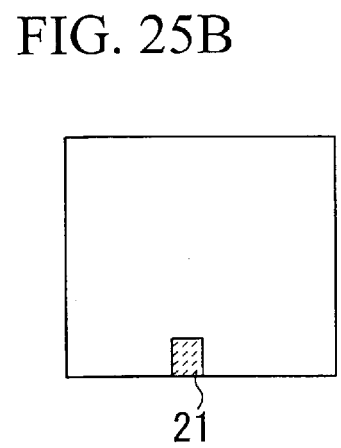
Figure 25E:
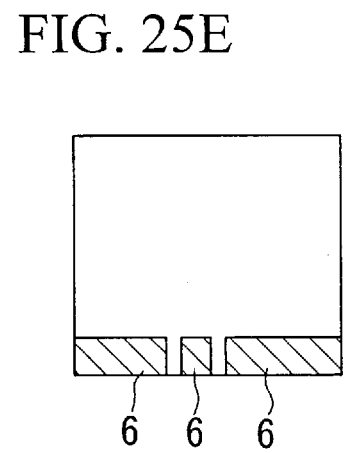
Figure 25H:
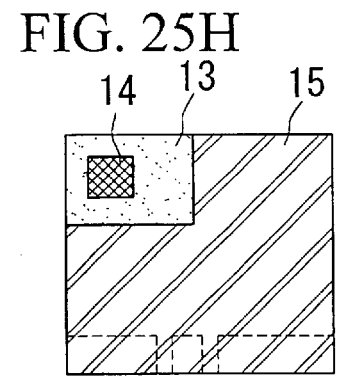
Figure 25C:
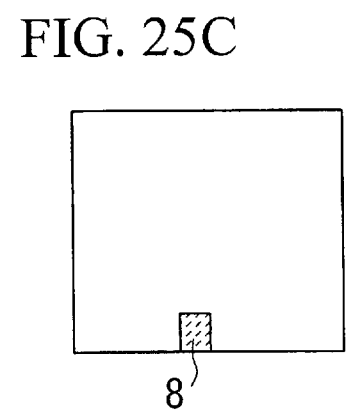
Figure 25F:
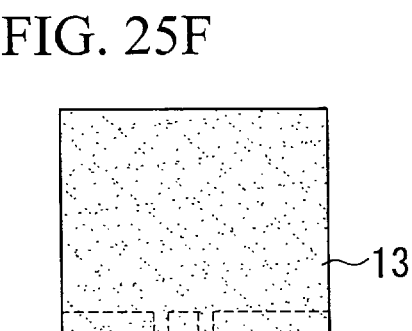

First, the lower shield layer 11, the lower electrode layer 12, the MTJ film 8 and the upper electrode layer 14 are sequentially formed on the substrate 10 (step (1) in FIG. 25A). A stencil PR 21 is formed on the layer 14 and then subjected to milling (step (2) in FIG. 25B). Subsequently, the side walls of the patterned MTJ film 8 are oxidized or nitrided (step (3) in FIG. 25C). For the oxidation, use can be made of a method in which spontaneous oxidization is caused to occur in air, in an atmosphere of oxygen diluted by inert elements or in an oxygen atmosphere at a lowered pressure, or of a method in which a plasma is generated in an atmosphere of oxygen diluted by inert elements at an adjusted pressure to thereby make the element in question contact the plasma (plasma oxidizing method). For the nitridation, a method in which a plasma is generated in an atmosphere of nitrogen diluted by an inert gas at an adjusted pressure to make the element in question contact the plasma can suitably be used. It is also possible to oxidize or nitride the side walls of the MTJ film 8, during the time when the milling is being carried out, by introducing a suitable amount of oxygen or nitrogen in the milling gas. After the oxidization or nitridation step has been completed, the stencil PR 21 is removed. A PR 22 is further formed (step (4) in FIG. 25D), and the longitudinal biasing layer 6 is formed and lifted off (step (5) in FIG. 25E). Subsequently, the insulating layer 13 is formed and then shaved by means of chemical-mechanical polishing (CMP) down to a level where the upper electrode layer 14 is exposed (step (6) in FIG. 25F). A recess is formed in the insulating layer 13 down to such a depth that the lower electrode layer 12 is exposed (step (7) in FIG. 25G) and then the upper shield layer 15 is formed (step (8) in FIG. 25H).

FIGS. 26A to 26H show, by way of example, a process for manufacturing the magnetoresistive effect element according to the third embodiment, wherein the element is manufactured in sequential steps (1) to (8).

Figure 26A:
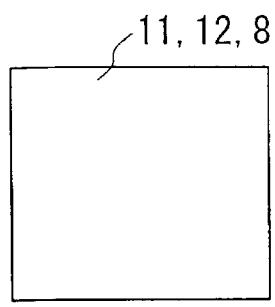
FIGS. 26A to 26H are illustrations showing in plan view the magnetoresistive effect element according to the third embodiment in various manufacturing steps.
Figure 26D:
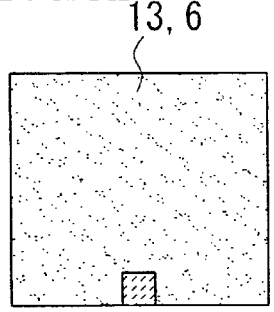
Figure 26G:
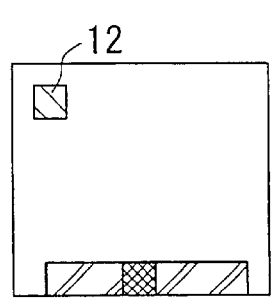
Figure 26B:
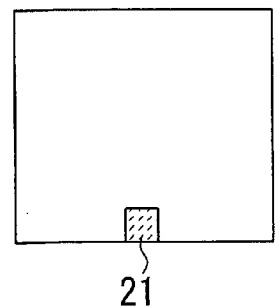
Figure 26E:
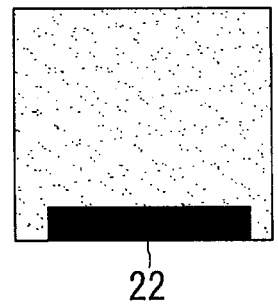
Figure 26H:
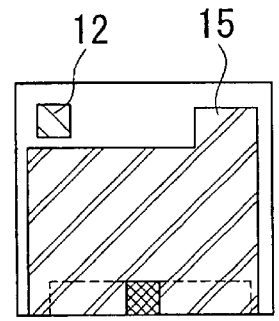
Figure 26C:
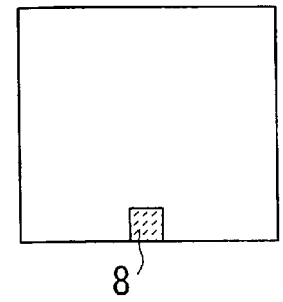
Figure 26F:
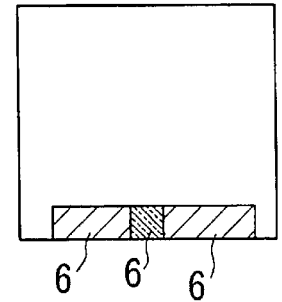

First, the lower shield layer 11, the lower electrode layer 12 and the MTJ film 8 are sequentially formed on the substrate 10 (step (1) in FIG. 26A). A stencil PR 21 is formed thereon (step (2) in FIG. 26B) and then subjected to milling (step (3) in FIG. 26C), whereafter the insulating layer 13 and the longitudinal biasing layer 6 are sequentially formed and lifted off (step (4) in FIG. 26D). A PR 22 is then formed and subjected to milling (step (5) in FIG. 26E) and subsequently end portions of the patterned MTJ film are oxidized or nitrided (step (6) in FIG. 26F). For the oxidation, use can be made of a method in which spontaneous oxidization is caused to occur in the air, in an atmosphere of oxygen diluted by inert elements or in an oxygen atmosphere at a lowered pressure, or of a method in which a plasma is generated in an atmosphere of oxygen diluted by inert elements at an adjusted pressure to thereby make the element in question contact the plasma (plasma oxidizing method). For the nitridation, a method in which a plasma is generated in an atmosphere of nitrogen diluted by an inert gas at an adjusted pressure to make the element in question contact the plasma can suitably be used. It is also possible to oxidize or nitride the side walls of the MTJ film, during the time when the milling is being carried out, by introducing a suitable amount of oxygen or nitrogen in the milling gas. After the oxidization or nitridation step has been completed, the PR 22 is removed (step (6) in FIG. 26F). A recess is formed in the insulating layer 13 down to such a depth that the lower electrode layer 12 is exposed (step (7) in FIG. 26G) and then the upper shield layer 15 is formed (step (8) in FIG. 26H).

The magnetoresistive effect element according to the fourth embodiment can be manufactured in a process similar to that described above for the third embodiment, and therefore a further description of this process will not be given herein.

FIGS. 27A to 27F show, by way of example, a process for manufacturing the magnetoresistive effect element according to the fifth embodiment, wherein the element is manufactured in sequential steps (1) to (6).

Figure 27A:
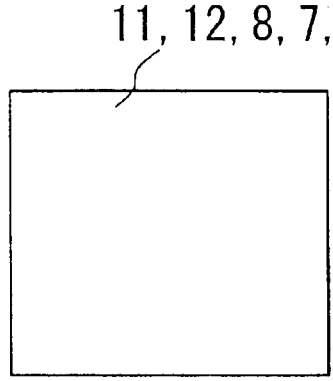
FIGS. 27A to 27F are illustrations showing in plan view the magnetoresistive effect element according to the fifth embodiment in various manufacturing steps.
Figure 27D:
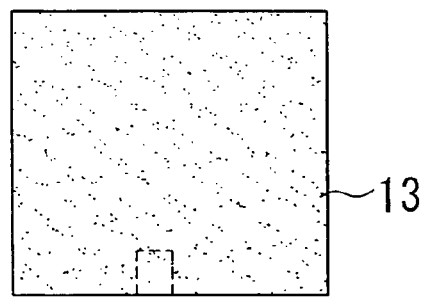
Figure 27B:
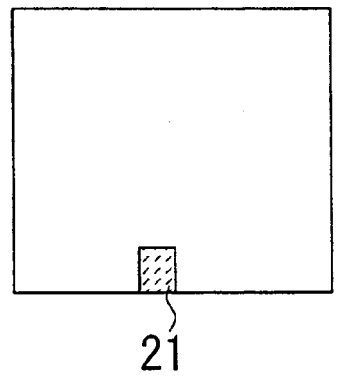
Figure 27E:
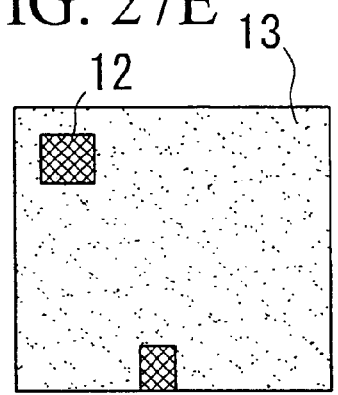
Figure 27C:
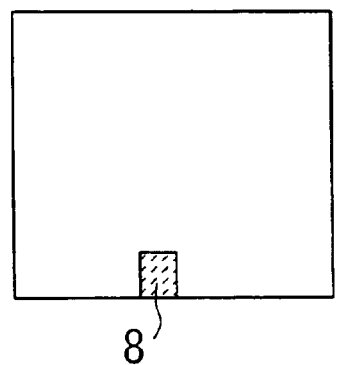
Figure 27F:
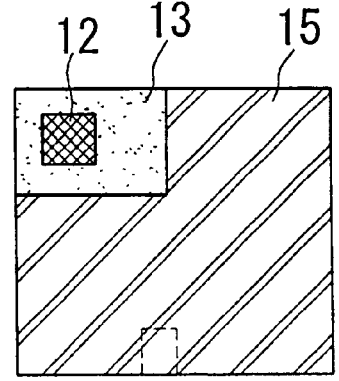

The lower shield layer 11, the lower electrode layer 12, the MTJ film 8, the interface control layer 7 and the longitudinal biasing layer 6 are sequentially formed on the substrate 10 (step (1) in FIG. 27A). A stencil PR 21 is formed thereon (step (2) in FIG. 27B) and then subjected to milling, and thereafter the side walls of the patterned MTJ film 8 are oxidized or nitrided (step (3) in FIG. 27C). For the oxidation, use can be made of a method in which spontaneous oxidization is caused to occur in air, in an atmosphere of oxygen diluted by inert elements or in an oxygen atmosphere at a lowered pressure, or of a method in which a plasma is generated in an atmosphere of oxygen diluted by inert elements at an adjusted pressure to thereby make the element in question contact the plasma (plasma oxidizing method). For the nitridation, a method in which a plasma is generated in an atmosphere of nitrogen diluted by an inert gas at an adjusted pressure to make the element in question contact the plasma can suitably be used. It is also possible to oxidize or nitride the side walls of the MTJ film 8, during the time when the milling is being carried out, by introducing a suitable amount of oxygen or nitrogen in the milling gas. After the oxidization or nitridation step has been completed, the insulating layer 13 is formed and then lifted off (step (4) in FIG. 27D). A recess is formed in the insulating layer 13 down to such a depth that the lower electrode layer 12 is exposed (step (5) in FIG. 27E), and the upper electrode layer 14 and the upper shield layer 15 are formed (step (6) in FIG. 27F).

An example of application of the magnetoresistive effect element according to the present invention to a magnetic recording/reproducing head and a magnetic recording system will now be described.

Figure 28:
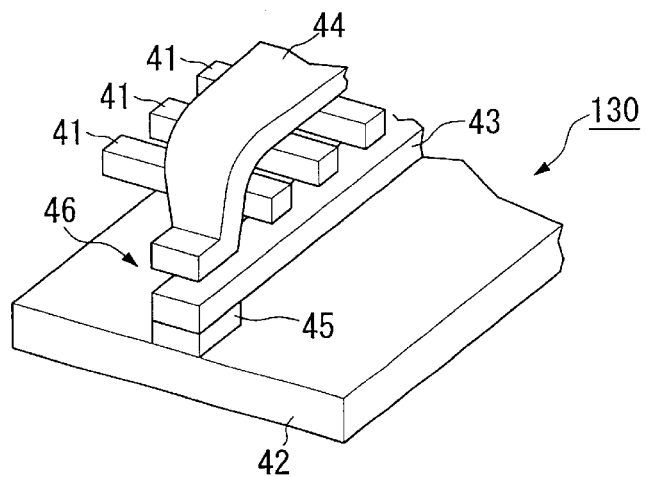
FIG. 28 is a perspective view of a part of a recording/reproducing element to which a magnetoresistive effect element according to the present invention is applied.

FIG. 28 is an illustration schematically showing a magnetic recording/reproducing head to which the magnetoresistive effect element according to the present invention is applied. This magnetic recording/reproducing head 130 is formed having, on a substrate 42, a reproducing head 45 comprised of the magnetoresistive effect element and a recording head 46 comprised of a magnetic pole piece 43, a coil 41 and an upper magnetic pole piece 44. In this case, an upper shield film and a lower magnetic film may be combined or may be provided separately. With this head, a signal can be written onto a recording medium and read from the recording medium. The sensing portion of the reproducing head and the magnetic gap of the recording head are thus formed at overlapped positions on the same slider, so that both heads can be positioned simultaneously on the same track. This head is machined to form a slider and mounted on a magnetic recording system.

Figure 29:
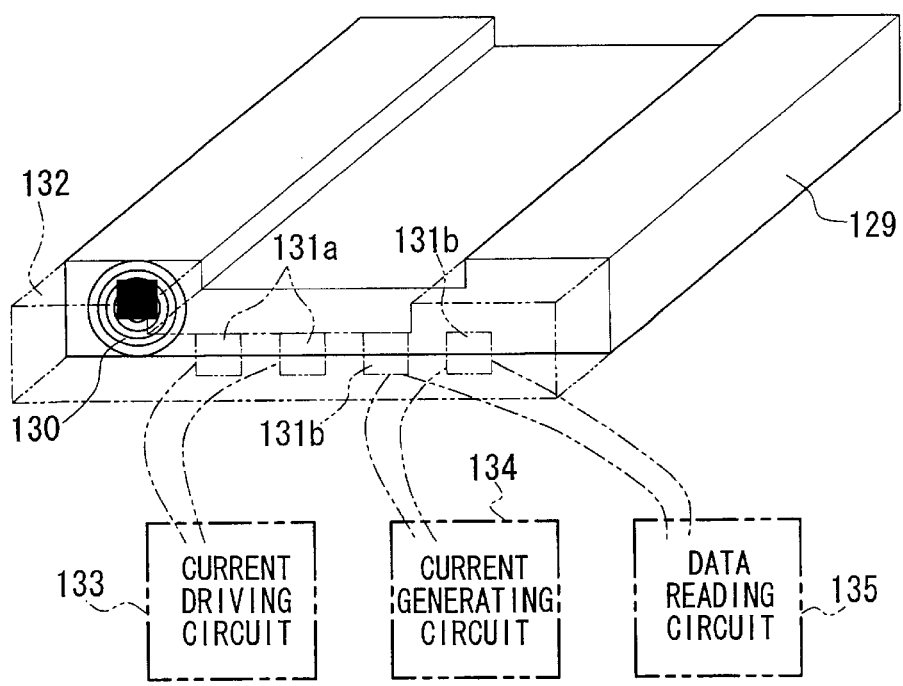
FIG. 29 is a diagram showing a magnetoresistive conversion system which comprises the magnetic recording/reproducing head shown in FIG. 28.

FIG. 29 is a diagram showing a magnetoresistive conversion system which comprises the magnetic recording/reproducing head shown in FIG. 28. In this system, recording/reproducing element portions (magnetic recording/reproducing heads) 130 are formed on a substrate 129 serving as a slider, and are protected with a protective film 132. The substrate 129 is composed of a composite ceramic such as $Al_2O_3$—TiO, and the protective film 132 is composed of DLC (diamond-like carbon) as an example.

An electrode terminal 131a connecting to the recording element portion (the magnetic recording head) and an electrode terminal 131b connecting to the reproducing element portion (the magnetic reproducing head) are formed onto the recording/reproducing element portion 130. The electrode terminal 131a is also connected to a current driving circuit 133, which applies a drive current to the recording element portion for the recording activity. The electrode terminal 131b is also connected to a current generating circuit 134 and a data reading circuit 135. The current generating circuit 134 makes a sense current flow through the reproducing element portion. On the other hand, the data reading circuit 135 detects a voltage change due to a change in resistivity of the reproducing element portion as a function of a detected magnetic field, thereby reads out the recorded data onto a magnetic recording medium. As stated above, the magnetoresistive conversion system comprises the recording/reproducing element portion 130, the current generating circuit 134 and the data reading circuit 135.

Figure 30:
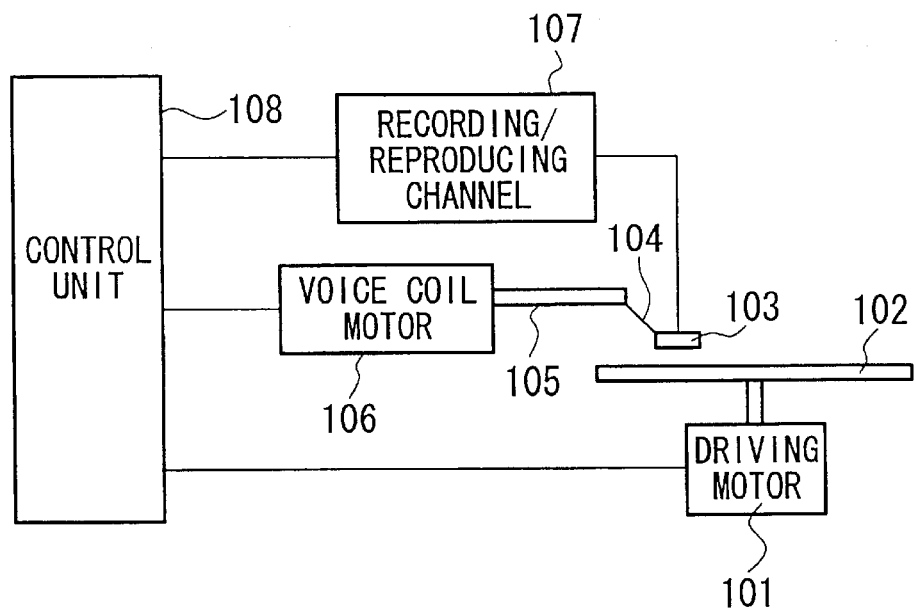
FIG. 30 is a diagram showing an example of a magnetic recording system which utilizes the magnetoresistive conversion system shown in FIG. 29.

FIG. 30 is a diagrammatic illustration showing an example of a magnetic recording system which utilizes the magnetoresistive conversion system shown in FIG. 29. This magnetic recording system is formed having the magnetoresistive conversion system which comprises a magnetic recording/reproducing head 103, a magnetic recording medium 102 which comprises a plurality of tracks for data recording, a voice coil motor (hereinafter referred to as "VCM"; a first actuator) 103 which moves the magnetic recording/reproducing head 103 to a predetermined position on the magnetic recording medium 102, and a motor 101 (a second actuator) which drives the magnetic recording medium 102 so as to rotate this medium.

As shown in FIG. 30, the magnetic recording/reproducing head 103 is attached to a suspension 104 and an arm 105, and is set to a position to oppose the magnetic recording surface of the magnetic recording medium 102 rotated by the driving motor 101. The VCM 106 controls the tracking operation for the magnetic recording/reproducing head 103. Recording/reproducing activities are carried out based on the signal transmitted from a recording/reproducing channel 107 to the magnetic recording/reproducing head 103. The recording/reproducing channel 107, the VCM 106 which performs the positioning of the head and the motor 101 which rotates the magnetic recording medium 102 work together under control of a control unit 108.

Figure 31:
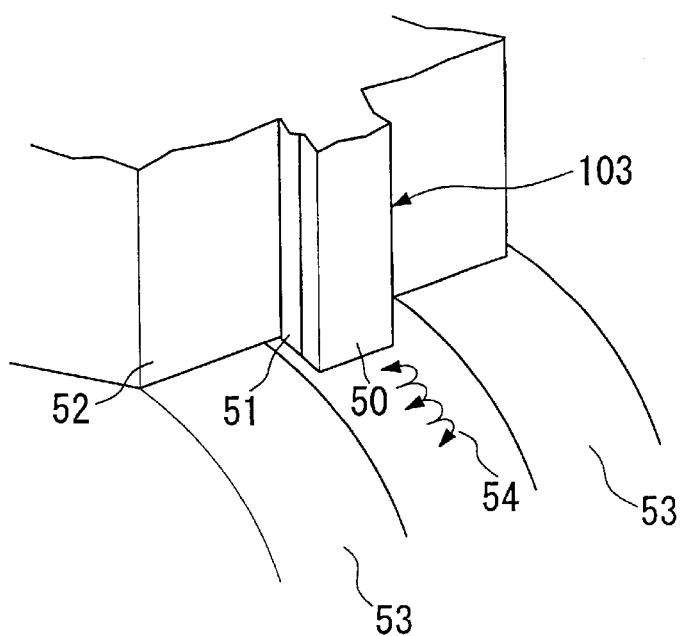
FIG. 31 is an illustration schematically showing a magnetic recording/reproducing apparatus in which a magnetoresistive effect element according to the invention is used.

FIG. 31 shows a perspective view of a concrete example of the magnetic recording system. In this example, a magnetic recording/reproducing head 103 comprised of a reproducing head 51 and a recording head 50 is formed on a substrate 52 serving as a head slider, which is positioned on a magnetic recording medium 53 to carry out reproduction. The magnetic recording medium 53 rotates, while the head slider opposes the magnetic recording medium 53 and thus performs a relative movement thereto with a gap not greater than 0.2 μm or in a contacted condition. With this structure, the reproducing head 51 is set to such a position that a magnetic signal recorded on the magnetic recording medium 53 can be read from its leakage magnetic field 54.

Examples of the magnetoresistive effect element according to the present invention will now be described.

EXAMPLE 1

Example 1 corresponds to the magnetoresistive effect element provided in accordance with the first embodiment. An element having the structure shown in FIG. 8 was produced. For the MTJ film, a lamination of Ta (3 nm)/ $Ni_{82}Fe_{18}$ (5 nm)/$Co_{90}Fe_{10}$ (0.5 nm)/Al oxide (0.7 nm)/ $Co_{90}Fe_{10}$ (2 nm)/Ru (0.7 nm)/$Co_{90}Fe_{10}$ (2 nm)/$Pt_{46}Mn_{54}$ (15 nm)/Ta (3 nm) was used. After the formation of the film, a heat treatment was carried out at 250° C. for five hours with a magnetic field of 500 Oe being applied in a direction perpendicular to that during the formation of the film. In the patterning process of the MTJ film in this experimental production of the element, the MTJ film was patterned by means of milling up to the middle of the pinned layer ($Co_{90}Fe_{10}$ (2 nm)/Ru (0.7 nm)/$Co_{90}Fe_{10}$ (2 nm)). For the patterning of the MTJ film and the oxidation of the end portions of the patterned MTJ film, use was made of a method of normal milling plus plasma oxidation. More specifically, the MTJ film was milled by means of a normal milling apparatus in a pure Ar-gas atmosphere at 0.3 Pa, whereafter the film was moved into a plasma oxidation apparatus (ashing apparatus) in which the end portions of the MTJ film and the milling residues on the pinned layer were oxidized. The conditions of the ashing process were such that the end portions of the MTJ film were in contact for twenty minutes with a plasma generated in an atmosphere containing 0.3 Pa of Ar and 0.1 Pa of $O_2$ by supplying RF power at 200 W thereto.

For comparison with the above elements, further elements were also manufactured on an experimental basis in which the plasma oxidation process was omitted. For these elements, the following sub-elements were used:

Substrate—A 2 nm thick AlTiC layer on which alumina is deposited with a thickness of 10 μm;

Lower shield layer—A layer of $Co_{65}Ni_{12}Fe_{23}$ (composition expressed in atomic percent; same applies in the following description) of 1 μm in thickness;

Lower electrode layer—Ta (1.5 nm)/Pt (10 nm)/Ta (10 nm);

Upper electrode layer—Ta (1.5 nm)/Au (20 nm)/Ta (3 nm);

Upper shield layer—A layer of $Co_{89}Zr_4Ta_4Cr_3$ of 1 μm in thickness;

Insulating layer—A 40 nm thick alumina layer;

Longitudinal biasing layer—Cr (10 nm)/$Co_{74.5}Cr_{10.5}Pt_{15}$ (36 nm);

Interface control layer—not provided;

Lower gap layer—not provided;

Upper gap layer—not provided; and

Upper layer—not provided.

Each element was machined to form an integrated recording/reproducing head such as that shown in FIG. 28 and a slider therefor, with which data was recorded on and reproduced from a medium made of a CoCrTa group material. For the recording/reproducing, the width of the track for writing data was set to 3 μm, the writing gap to 0.2 μm and the width of the track for reading data to 2 μm. The curing process of the photoresist used for forming the coil portion of the write head portion was performed for two hours at 250° C. During this process, the magnetization in the pinned and pinning layers which should essentially be oriented in the direction of the height of the element rotated, as a result of which this element did not function correctly as a magnetoresistive element. Therefore, after forming the reproducing head portion and the recording head portion, the element was subjected to a magnetizing heat treatment in a magnetic field of 500 Oe for one hour at 200° C. The rotation of the easy magnetization axis of the free layer towards the magnetization direction due to this magnetizing heat treatment was not observed in the substance from its magnetization curve.

Ten elements (or samples) were produced by the same production steps. The coercive force of the medium and MrT were selected to be 3.0 k Oe and 0.35 memu/cm$^2$, respectively. Reproduction outputs were measured with these experimentally produced elements. The measurement results of the reproduction outputs of the ten elements are shown in Tables 1 and 2. In the case where the plasma oxidization was not performed with respect to the end faces of the MTJ film and the remaining pinned layer, none of the elements had a reproduction output equal to or greater than 3 mV, and the reproduction outputs of the elements were not greater than 1 mV for up to nine out of ten. When an element having an output equal to or greater than 3 mV is determined acceptable, the above yield is zero. The elements with substantially zero outputs have significantly small resistance, from which it is appreciated that bypass routes of the sense current are formed by the conductive area expanded by the burr and/or the milling residues of the pinned layer formed in the patterning process of the MTJ film. In contrast, in the case of the combination of the normal milling and the plasma oxidization, the elements had reproduction outputs equal to or greater than 3 mV for up to eight out of ten, the yield thus being improved to 80%. It is appreciated that bypass routes of the sense current have disappeared due to the plasma oxidization of the end faces of the MTJ film and the milling residues of the pinned layer, resulting in an improved output.

TABLE 1

| (without plasma oxidization) | | | | | | | | | | |
|---|---|---|---|---|---|---|---|---|---|---|
| Sample No. | 1 | 2 | 3 | 4 | 5 | 6 | 7 | 8 | 9 | 10 |
| Reproduction output (mV) | 1.1 | 0.4 | 0.9 | 0.3 | 0.7 | 0.9 | 0.7 | 0.5 | 0.1 | 0.9 |

TABLE 2

| (with plasma oxidization) | | | | | | | | | | |
|---|---|---|---|---|---|---|---|---|---|---|
| Sample No. | 1 | 2 | 3 | 4 | 5 | 6 | 7 | 8 | 9 | 10 |
| Reproduction output (mV) | 3.2 | 3.2 | 3.1 | 2.4 | 3.0 | 3.1 | 3.3 | 3.3 | 3.0 | 1.9 |

EXAMPLE 2

Magnetoresistive effect elements corresponding to the third embodiment were produced.

For the MTJ film, a lamination of Ta (3 nm)/Pt$_{46}$Mn$_{54}$ (15 nm)/Co$_{90}$Fe$_{10}$ (2 nm)/Ru (0.8 nm)/Co$_{90}$Fe$_{10}$ (2 nm)/Al oxide (1.5 nm)/Co$_{90}$Fe$_{10}$ (0.5 nm)/Ni$_{82}$Fe$_{18}$ (5 nm)/Ta (3 nm) was used. After the formation of the film, a heat treatment was carried out for five hours at 250° C. with a magnetic field of 500 Oe being applied in a direction perpendicular to that during the formation of the film. In the patterning process of the MTJ film in the experimental production of the element, all the layers of the MTJ film were patterned by means of milling down to and including the lowermost Ta layer. For the patterning of the MTJ film and the oxidization or nitridation of the end portions of the patterned MTJ film, the following five methods were selectively used:

(1) Normal Milling Plus Plasma Oxidization

The MTJ film was milled by means of a normal milling apparatus in a pure Ar-gas atmosphere at 0.3 Pa, whereafter the film was moved into a plasma oxidization apparatus (ashing apparatus) in which the end portions of the MTJ film were oxidized. The conditions of the ashing process were such that the end portions of the MTJ film were contacted for twenty minutes by a plasma generated in an atmosphere containing 0.3 Pa of Ar and 0.1 Pa of O$_2$ by supplying RF power at 200 W thereto.

(2) Normal Milling Plus Spontaneous Oxidization

The MTJ film was milled by means of a normal milling apparatus in a pure Ar-gas atmosphere at 0.3 Pa, whereafter the end portions of the MTJ film was exposed to a dry oxygen atmosphere of 1 atmospheric pressure for one hour.

(3) Normal Milling Plus Nitridation

The MTJ film was milled with a normal milling apparatus in a pure Ar-gas atmosphere at 0.3 Pa, whereafter the end portions of the MTJ film were contacted in a plasma oxidization apparatus (ashing apparatus) by a plasma generated in an atmosphere containing 0.5 Pa of Ar and 0.5 Pa of N$_2$ for 120 minutes by supplying RF power of 200 W thereto.

(4) Milling in an Atmosphere of Oxygen Plus Ar 0.3 Pa of Ar and 0.1 Pa of oxygen were simultaneously introduced in a milling apparatus, whereby the milling and the oxidization of the end portions of the MTJ film were carried out simultaneously.

(5) Milling in an Atmosphere of Nitrogen Plus Ar 0.3 Pa of Ar and 0.1 Pa of nitrogen were simultaneously introduced in a milling apparatus, whereby the milling and the nitridation of the end portions of the MTJ film were carried out simultaneously.

For the comparison, further elements were produced on an experimental basis without the plasma oxidization process. For these elements, the following sub-elements were used:

Substrate—A 2 nm thick AlTiC layer on which alumina is deposited with a thickness of 10 μm;

Lower shield layer—A layer of Co$_{65}$Ni$_{12}$Fe$_{23}$ (composition expressed in atomic percent; same applies in the following description) of 1 μm in thickness;

Lower electrode layer—Ta (1.5 nm)/Mo (80 nm)/Ta (3 nm);

Upper electrode layer—Ta (1.5 nm)/Au (40 nm)/Ta (3 nm);

Upper shield layer—A layer of Co$_{89}$Zr$_4$Ta$_4$Cr$_3$ of 1 μm thick;

Insulating layer—A 40 nm thick alumina layer;

Longitudinal biasing layer—Cr (10 nm)/Co$_{74.5}$Cr$_{10.5}$Pt$_{15}$ (36 nm);

Interface control layer—not provided;

Lower gap layer—not provided;

Upper gap layer—not provided; and

Upper layer—not provided.

Each magnetoresistive effect element was machined to form an integrated recording/reproducing head such as that shown in FIG. 28 and a slider therefor, with which data was recorded on and reproduced from a medium made of a CoCrTa group material. For the recording/reproducing, the width of the track for writing data was set to 3 μm, the writing gap to 0.2 μm and the width of the track for reading data to 2 μm. The curing process of the photoresist used for forming the coil portion of the write head portion was performed for two hours at 250° C. During this process, the magnetization in the pinned and pinning layers which should essentially be oriented in the direction of the height of the element rotated, as a result of which the element did not function correctly as a magnetoresistive effect element. Therefore, after forming the reproducing head portion and the recording head portion, the element was subjected to a magnetizing heat treatment in a magnetic field of 500 Oe for one hour at 200° C. The rotation of the easy magnetization axis of the free layer towards the magnetization direction due to this magnetizing heat treatment was not observed in the substance from its magnetization curve.

Ten elements (or samples) were produced by the same production steps. The coercive force of the medium and MrT were selected to be 3.0 k Oe and 0.35 memu/cm$^2$, respectively. Reproduction outputs were measured with these experimentally produced elements. The measurement results of the reproduction outputs of the ten elements in each group are shown in Tables 3 to 8. In the case where the plasma oxidization of the end faces of the MTJ film was omitted, two of the ten elements had reproduction outputs equal to or greater than 3 mV, but the remaining eight had small reproduction outputs wherein the outputs were substantially zero for five of them. When an element having an output equal to or greater than 3 mV is determined acceptable, the above yield is 20%, which is quite low. The elements with substantially zero outputs had significantly small resistance, from which it is appreciated that the pinning layer and the free layer have been short-circuited by the burr formed in the patterning process of the MTJ film. In contrast, in the case of the combination of the normal milling and the plasma oxidization, the elements had reproduction outputs equal to or greater than 3 mV for up to eight out of ten, the yield thus being improved to 80%. The yield was 70% in the case of the combination of the normal milling and the spontaneous oxidization, 60% in the case of the combination of the normal milling and the nitridation, 50% in the case of the milling in the atmosphere of oxygen plus Ar, and 40% in the case of the milling in the atmosphere of nitrogen plus Ar. Thus, all the yield rates were improved as compared to the case where no such steps were taken. It is appreciated that, when the present invention is applied, the burr formed in the patterning process of the MTJ film is oxidized or nitrided into an insulating material and thus does not cause the MR ratio to decrease. Although the combination of the normal milling with the plasma oxidization exhibited the best characteristics in these examples, it may be possible in the other cases to obtain characteristics comparable to those in the case of the plasma oxidization by optimizing the conditions for the milling and the oxidization and nitridation of the end portions of the MTJ film.

TABLE 3

(without oxidization)

| Sample No. | 1 | 2 | 3 | 4 | 5 | 6 | 7 | 8 | 9 | 10 |
|---|---|---|---|---|---|---|---|---|---|---|
| Reproduction output (mV) | 2.4 | 1.2 | 0 | 0.7 | 0 | 0 | 3.1 | 0 | 0 | 3.0 |

TABLE 4

(with normal milling plus plasma oxidization)

| Sample No. | 1 | 2 | 3 | 4 | 5 | 6 | 7 | 8 | 9 | 10 |
|---|---|---|---|---|---|---|---|---|---|---|
| Reproduction output (mV) | 3.1 | 3.2 | 3.0 | 0.8 | 3.1 | 3.2 | 3.0 | 3.0 | 0 | 3.0 |

TABLE 5

| Sample No. | 1 | 2 | 3 | 4 | 5 | 6 | 7 | 8 | 9 | 10 |
|---|---|---|---|---|---|---|---|---|---|---|
| Reproduction output (mV) | 3.2 | 3.0 | 0 | 0 | 3.0 | 3.0 | 3.1 | 3.0 | 3.1 | 0 |

TABLE 6

(with normal milling plus nitridation)

| Sample No. | 1 | 2 | 3 | 4 | 5 | 6 | 7 | 8 | 9 | 10 |
|---|---|---|---|---|---|---|---|---|---|---|
| Reproduction output (mV) | 0 | 0.2 | 3.1 | 3.0 | 1.4 | 3.2 | 3.0 | 3.0 | 0 | 3.0 |

TABLE 7

(with milling in an atmosphere of oxygen plus Ar)

| Sample No. | 1 | 2 | 3 | 4 | 5 | 6 | 7 | 8 | 9 | 10 |
|---|---|---|---|---|---|---|---|---|---|---|
| Reproduction output (mV) | 0.7 | 0.6 | 1.4 | 3.1 | 3.0 | 2.4 | 3.0 | 3.1 | 3.1 | 1.9 |

TABLE 8

(with milling in an atmosphere of nitrogen plus Ar)

| Sample No. | 1 | 2 | 3 | 4 | 5 | 6 | 7 | 8 | 9 | 10 |
|---|---|---|---|---|---|---|---|---|---|---|
| Reproduction output (mV) | 3.1 | 3.2 | 2.1 | 2.3 | 3.1 | 1.4 | 0 | 1.7 | 1.9 | 3.2 |

EXAMPLE 3

Magnetoresistive effect elements corresponding to the fourth embodiment were produced.

For the MTJ film, a lamination of Ta (3 nm)/Pt$_{46}$Mn$_{54}$ (15 nm)/Co$_{90}$Fe$_{10}$ (2 nm)/Ru (0.8 nm) (0.5 nm)/Ni$_{82}$Fe$_{18}$ (5 nm)/Ta (3 nm) was used. After the formation of the film, a heat treatment was carried out for five hours at 250° C. with a magnetic field of 500 Oe being applied in a direction perpendicular to that during the formation of the film. In the patterning process of the MTJ film in the experimental production of each element, all the layers of the MTJ film were patterned by means of milling up to and including the lower most Ta layer. The MTJ film was milled by means of a normal milling apparatus in a pure Ar-gas atmosphere at 0.3 Pa, whereafter the film was moved into a plasma oxidization apparatus (ashing apparatus) in which the end faces of the MTJ film were oxidized. The conditions of the ashing process were such that the end portions of the MTJ film were contacted for twenty minutes with a plasma generated in an atmosphere containing 0.3 Pa of Ar and 0.1 Pa of O$_2$ by supplying RF power at 200 W thereto. For the comparison, further elements were manufactured on an experimental basis in which the plasma oxidization process was omitted. For these elements, the following sub-elements were used:

Substrate—A 2 nm thick AlTiC layer on which alumina is deposited with a thickness of 10 μm;

Lower shield layer—A layer of Co$_{65}$Ni$_{12}$Fe$_{23}$ (composition expressed in atomic percent; same applies in the following description) of 1 μm thick;

Lower electrode layer—Ta (1.5 nm)/Mo (80 nm)/Ta (3 nm);

Upper electrode layer—Ta (1.5 nm)/Au (40 nm)/Ta (3 nm);

Upper shield layer—A layer of Co$_{89}$Zr$_4$Ta$_4$Cr$_3$ of 1 μm thick;

Insulating layer—A 40 nm thick alumina layer;

Longitudinal biasing layer—Cr (10 nm)/Co$_{74.5}$Cr$_{10.5}$Pt$_{15}$ (36 nm);

Interface control layer—not provided;

Lower gap layer—not provided;

Upper gap layer—not provided; and

Upper layer—not provided.

Each element was machined to form an integrated recording/reproducing head such as that shown in FIG. 28 and a slider therefor, with which data was recorded on and reproduced from a medium made of a CoCrTa group material. For the recording/reproducing, the width of the track for writing data was set to 3 μm, the writing gap to 0.2 μm and the width of the track for reading data to 2 μm. The curing process of the photoresist used for forming the coil portion of the write head portion was performed for two hours at 250° C. During this process, the magnetization in the pinned and pinning layers which should essentially be oriented in the direction of the height of the element rotated, as a result of which the element did not function correctly as a magnetoresistive effect element. Therefore, after forming the reproducing head portion and the recording head portion, the element was subjected to a magnetizing heat treatment in a magnetic field of 500 Oe for one hour at 200° C. The rotation of the easy magnetization axis of the free layer towards the magnetization direction due to this magnetizing heat treatment was not observed in the substance from its magnetization curve.

Ten elements (or samples) were produced by the same production steps. The coercive force of the medium and MrT were selected to be 3.0 k Oe and 0.35 memu/cm$^2$, respectively. Reproduction outputs were measured with these experimentally produced elements. The measurement results of the reproduction outputs of the ten elements of each group are shown in Tables 9 and 10. In the case where the plasma oxidization was not performed with respect to the end faces of the MTJ film, there was one element whose reproduction output was equal to or greater than 3 mV, but the reproduction outputs of the other nine elements were small. When an element having an output equal to or greater than 3 mV is determined acceptable, the yield is 10%, which is very low. The elements with substantially zero outputs had significantly small resistance, from which it is appreciated that the pinning layer and the free layer are short-circuited by the burr formed in the patterning process of the MTJ film. In contrast, in the case of the combination of the normal milling and the plasma oxidization, the elements had outputs equal to or greater than 3 mV for up to nine out of ten, thus the yield being improved to 90%. It is appreciated that, when the present invention is applied, the burr formed in the patterning process of the MTJ film is oxidized into an insulating material and thus does not cause the MR ratio to decrease.

TABLE 9

(without oxidization)

| Sample No. | 1 | 2 | 3 | 4 | 5 | 6 | 7 | 8 | 9 | 10 |
|---|---|---|---|---|---|---|---|---|---|---|
| Reproduction output (mV) | 0 | 1.3 | 0.9 | 0.4 | 0 | 1.6 | 0.3 | 3.1 | 0 | 2.4 |

TABLE 10

(with normal milling plus plasma oxidization)

| Sample No. | 1 | 2 | 3 | 4 | 5 | 6 | 7 | 8 | 9 | 10 |
|---|---|---|---|---|---|---|---|---|---|---|
| Reproduction output (mV) | 3.0 | 3.0 | 3.1 | 3.3 | 3.0 | 3.1 | 3.2 | 0 | 3.1 | 3.1 |

EXAMPLE 4

Magnetoresistive effect elements corresponding to the fifth embodiment were produced.

For the MTJ film, a lamination of Ta (3 nm)/$Pt_{46}Mn_{54}$ (15 nm)/$Co_{90}Fe_{10}$ (2 nm)/Ru (0.8 nm)/$Co_{90}Fe_{10}$ (2 nm)/Al oxide (1.5 nm)/$Co_{90}Fe_{10}$ (0.5 nm)/$Ni_{82}Fe_{18}$ (5 nm)/Ta (3 nm) was used. After the formation of the film, a heat treatment was carried out for five hours at 250° C. with a magnetic field of 500 Oe being applied in a direction perpendicular to that during the formation of the film. In the patterning process of the MTJ film in the experimental production of each element, all the layers of the MTJ film were patterned by means of milling up to and including the lower most Ta layer. The MTJ film was milled by means of a normal milling apparatus in a pure Ar-gas atmosphere at 0.3 Pa, whereafter the film was moved into a plasma oxidization apparatus (ashing apparatus) in which the end faces of the MTJ film were oxidized. The ashing conditions were such that the end portions of the MTJ film were contacted for twenty minutes with a plasma generated in an atmosphere containing 0.3 Pa of Ar and 0.1 Pa of $O_2$ by supplying RF power at 200 W thereto. For the comparison, further elements were manufactured on an experimental basis in which the plasma oxidization process was omitted. For the sub-elements constituting each element, the following were used:

Substrate—A 2 nm thick AlTiC layer on which alumina is deposited with a thickness of 10 μm;

Lower shield layer—A layer of $Co_{65}Ni_{12}Fe_{23}$ (composition expressed in atomic percent; same applies in the following description) of 1 μm thick;

Lower electrode layer—Ta (1.5 nm)/Mo (80 nm)/Ta (3 nm);

Upper electrode layer—Ta (1.5 nm)/Au (40 nm)/Ta (3 nm);

Upper shield layer—A layer of $Co_{89}Zr_4Ta_{14}Cr_3$ of 1 μm thick;

Insulating layer—A 40 m thick alumina layer;

Longitudinal biasing layer—Cr (10 nm)/$Co_{74.5}Cr_{10.5}Pt_{15}$ (36 nm);

Interface control layer—not provided;

Lower gap layer—not provided;

Upper gap layer—not provided; and

Upper layer—not provided.

Each element was machined to form an integrated recording/reproducing head such as that shown in FIG. 28 and a slider therefor, with which data was recorded on and reproduced from a medium made of a CoCrTa group material. For the recording/reproducing, the width of the track for writing data was set to 3 μm, the writing gap to 0.2 μm and the width of the track for reading data to 2 μm. The curing process of the photoresist used for forming the coil portion of the write head portion was performed for two hours at 250° C. During this process, the magnetization in the pinned and pinning layers which should essentially be oriented in the direction of the height of the element rotated, as a result of which the element did not function correctly as a magnetoresistive effect element. Therefore, after forming the reproducing head portion and the recording head portion, the element was subjected to a magnetizing heat treatment for one hour in a magnetic field of 500 Oe at 200° C. The rotation of the easy magnetization axis of the free layer towards the magnetization direction due to this magnetizing heat treatment was not observed in substance from its magnetization curve.

Ten elements (or samples) were produced by the same production steps. The coercive force of the medium and MrT were selected to be 3.0 k Oe and 0.35 memu/$cm^2$, respectively. Reproduction outputs were measured with these experimentally produced elements. The measurement results of the reproduction outputs of the ten elements of each group are shown in Tables 11 and 12. In the case where the plasma oxidization was not performed with respect to the end faces of the MTJ film, there was one element whose reproduction output was equal to or greater than 3 mV, but the reproduction outputs of the other nine elements were small. When an element having an output equal to or greater than 3 mV is determined acceptable, the yield is 10%, which is very low. The elements with substantially zero outputs had significantly small resistance, from which it is appreciated that the pinning layer and the free layer are short-circuited by the burr formed in the patterning process of the MTJ film. In contrast, in the case of the combination of the normal milling and the plasma oxidization, the elements had outputs equal to or greater than 3 mV for up to eight out of ten, thus the yield rate being improved to 80%. It is appreciated that, when the present invention is applied, the burr formed in the patterning process of the MTJ film is oxidized into an insulating material and thus does not cause the MR ratio to decrease.

TABLE 11

(without oxidization)

| Sample No. | 1 | 2 | 3 | 4 | 5 | 6 | 7 | 8 | 9 | 10 |
|---|---|---|---|---|---|---|---|---|---|---|
| Reproduction output (mV) | 2.2 | 0.7 | 0.1 | 0.2 | 0.8 | 0 | 1.6 | 1.7 | 3.1 | 0 |

TABLE 12

(with normal milling plus plasma oxidization)

| Sample No. | 1 | 2 | 3 | 4 | 5 | 6 | 7 | 8 | 9 | 10 |
|---|---|---|---|---|---|---|---|---|---|---|
| Reproduction output (mV) | 3.0 | 3.1 | 3.1 | 3.1 | 0.9 | 3.1 | 3.1 | 0 | 3.2 | 3.0 |

A magnetic recording apparatus manufactured in accordance with the present invention on an experimental basis will now be described. This magnetic recording apparatus is provided with three magnetic discs (magnetic recording media) on a base and with a head drive circuit, a signal processing circuit and an input/output interface mounted on the back of the base. The apparatus is connectable to the exterior through a 32-bit bus line. Six heads are disposed so as to face opposite surfaces of the three discs, respectively. A rotary actuator (actuator means) for driving the heads, a drive and control circuit for the actuator and a motor directly connected to a spindle for the rotation of the discs are mounted in the apparatus. Each disc has a diameter of 46 mm and its surfaces are used for data recording each in the range defined by an inner diameter of 10 mm and an outer diameter of 40 mm. An embedded servo system is employed and the discs thus have no servo surfaces, so that recording at a high density is possible. This apparatus is arranged to be directly connectable to a small computer as its external storage unit. The input/output interface is mounted with a cache memory to comply with a bus line whose transfer rate ranges from 5 to 20 mega bytes per second. It is also possible to form a magnetic disc system of a large capacity by providing an external controller and connecting a plurality of apparatuses of the above type to the controller.

What is claimed:

1. A magnetoresistive effect element comprising:

a ferromagnetic tunnel junction film which comprises a free layer, a barrier layer immediately adjacent said free layer and a pinned layer immediately adjacent said barrier layer, wherein said ferromagnetic tunnel junction film comprises a pattern of a metallic material surrounded by an oxide of the metallic material or a nitride of the metallic material, and said metallic material is said free layer.

2. A magnetoresistive effect element comprising:

a ferromagnetic tunnel junction film which comprises a free layer, a barrier layer immediately adjacent said free layer and a pinned layer immediately adjacent said barrier layer, wherein said ferromagnetic tunnel junction film comprises a pattern of a metallic material surrounded by an oxide of the metallic material or a nitride of the metallic material, and said metallic material is said pinned layer.

3. A magnetoresistive effect element comprising:

a ferromagnetic tunnel junction film which comprises a free layer, a barrier layer immediately adjacent said free layer, a pinned layer immediately adjacent said barrier layer and a pinning layer immediately adjacent said pinned layer, wherein said ferromagnetic tunnel junction film comprises a pattern of a metallic material surrounded by an oxide of the metallic material or a nitride of the metallic material, and said metallic material is said pinning layer.

* * * * *